United States Patent [19]
Nishimoto et al.

[11] Patent Number: 5,619,784
[45] Date of Patent: Apr. 15, 1997

[54] VEHICLE ASSEMBLING METHOD

[75] Inventors: Syuji Nishimoto; Masahiro Osumi; Hisaaki Katsuki, all of Hiroshima; Tetsuya Murakami, Hiroshima-ken; Masakatsu Ohsugi, Hiroshima-ken; Hiroaki Inoue, Hiroshima-ken; Masamiti Kogai, Hiroshima; Nobuo Kihara, Hiroshima-ken, all of Japan

[73] Assignee: Mazda Motor Corporation, Hiroshima-ken, Japan

[21] Appl. No.: 400,319

[22] Filed: Mar. 3, 1995

Related U.S. Application Data

[63] Continuation of Ser. No. 880,715, May 8, 1992, abandoned.

[30] Foreign Application Priority Data

May 10, 1991 [JP] Japan ................. 3-106117
May 10, 1991 [JP] Japan ................. 3-135785
May 10, 1991 [JP] Japan ................. 3-135791

[51] Int. Cl.⁶ ........................................ B21D 39/03
[52] U.S. Cl. ........................ 29/430; 29/462; 29/464; 29/469; 29/527.1; 296/196; 296/197; 296/204; 296/209
[58] Field of Search .................... 296/196, 204, 296/209, 197, 203; 29/430, 462, 464, 469, 527.1, 897.32

[56] References Cited

U.S. PATENT DOCUMENTS

| | | | |
|---|---|---|---|
| 1,804,658 | 5/1931 | Tarbox | 296/209 |
| 2,757,447 | 8/1956 | Barenyi | 29/430 |
| 5,129,700 | 7/1992 | Trevisan et al. | 296/197 X |

FOREIGN PATENT DOCUMENTS

| | | |
|---|---|---|
| 2618746 | 2/1989 | France . |
| 2643034 | 8/1990 | France . |
| 62-111837 | 7/1987 | Japan . |
| 63-235174 | 9/1988 | Japan . |
| 64-28377 | 2/1989 | Japan . |

*Primary Examiner*—Joseph M. Gorski
*Attorney, Agent, or Firm*—Keck, Mahin & Cate

[57] ABSTRACT

A vehicle assembling method includes the steps of assembling a lower body shell a including underbody portion having a front floor and front body portion, assembling an upper body shell, including a roof member and right and left body side panels, and assembling the upper body shell and the lower body shell, moving rearward the lower body shell relative to the upper body shell, and engaging transverse opposite side ends of the lower body shell with lower end portions of the upper body shell to join the lower body shell with the upper body shell. The under body portion can be readily joined with the upper body shell, improving the workability of the joining operation. The structure of joint portion thereof can be simplified with a desirable sealing.

27 Claims, 47 Drawing Sheets

VEHICLE ASSEMBLING METHOD

This continuation application under 37 C.F.R. §1.62 of prior application Ser. No. 07/880,715, filed on May. 8, 1992, abandoned, entitled VEHICLE ASSEMBLING METHOD.

BACKGROUND OF THE INVENTION

1. Field of the Invention

The present invention relates to a vehicle assembling method in which an upper body shell and lower body shell are assembled separately and thereafter the lower body shell is moved to the upper body shell to be combined with the upper body shell.

2. Description of the Related

Generally, a conventional vehicle assembling process includes a pressing process in which a steel plate is processed, a body assembling process in which the body shell is assembled, an application process in which coating material is applied on the vehicle body surface, and an equipping process in which various fit-in parts are equipped for vehicle structure. Conventionally, an underbody portion including a floor member, a front body portion, a rear body portion, a body side panel, roof member and the like is sub-assembled in order to form a body shell. Thereafter, the equipping process is applied on the body. It should, however, be noted that it is difficult to automate the equipping process because the assembled body shell will hinder the equipping operation. In view of this, it has been proposed that a vehicle assembling process can be done efficiently by being automated as much as possible.

For example, Japanese Patent Public Disclosure No. 63-235174, laid open to the public in 1988, discloses a vehicle assembling process including steps of assembling the front body portion defining an engine room, an under body portion including the front floor and center floor and rear floor, an upper body shell including a body side panel and a roof member, fit-in parts, assembling the under body portion and front body portion to form lower body shell, and mounting the upper body shell on the lower body shell.

In Japanese Utility Model Public Disclosure No. 64-28377, there is disclosed a vehicle assembling process including steps of assembling lower body shell, including a front body portion and an under body portion, and an upper body shell including a body side panel, a roof member and cowl member, equipping these body panels, and joining the upper body shell with the lower body shell. Meanwhile, the upper body shell is formed with a side sill upper and the lower body shell is formed with a side sill lower. When the upper side sill upper and the side sill lower are combined, a whole side sill structure is formed.

In the above assembling techniques, the floor member is formed at side ends with a downwardly extending flange portion which is joined with a flange of the side sill by a plurality of bolts. It is, however, to be noted that joining the floor member with the side sill is not easy because a plurality of openings for inserting the bolts must align with each other. Another reason is that as manufacturing error of the floor member and the upper body shell increases, the flange portion of the floor panel is more difficult to be fitted with the flange of the side sill. As a result, it becomes difficult to combine the floor panel and the side sill. Otherwise, the joint of the floor panel and the side sill is less reliable.

In the assembling technique as disclosed in the Japanese Patent Public Disclosure No. 64-28377, it is necessary to join horizontal flanges of a side sill upper and lower when the upper body shell is combined with the lower body shell. It should be, however, noted that it is difficult to join the horizontal flanges of the side sills where the upper and lower body shell are not processed accurately. If they are joined by welding, coating of the body shell would be injured. The body shells cannot be smoothly joined by an automatic assembling method because of manufacturing error.

SUMMARY OF THE INVENTION

It is therefore an object of the present invention to provide a vehicle assembling method in which upper body and lower body shells can be readily desirably joined.

It is another object of the present invention to provide a vehicle assembling method which can improve work ability in equipping the vehicle body.

The above and other object of the present invention can be accomplished by a vehicle assembling method comprising steps of assembling a roof member with an upper body shell including body side a panel and right and left side sills, assembling alower body shell including an under body having a front floor and front body portion, and assembling the upper body shell and the lower body shell, the improvement further comprising steps of forming a bearing portion on right and left side sills of the upper body shell for bearing right and left ends of the front floor, carrying forwardly the upper body shell and lower body shell to equipping lines and equipping the upper and lower body shells respectively, carrying the under body portion rearward relative to the upper body shell and engaging both ends of the front floor with the bearing portions of the right and left side sills and joining them together.

In a preferred embodiment, the lower body shell including the under body portion and front body portion is integrated with the under body portion is equipped with parts. Thereafter, the lower body shell is joined with the upper body shell.

In another embodiment, the under body portion and the front body portion which is not joined with the under body portion are equipped with parts respectively. Thereafter, both body portions are joined with the upper body shell.

In a further embodiment, the under body portion and the front body portion which is not joined with the under body portion are equipped with parts separately. Thereafter, the front body portion is joined with the upper body shell and the under body portion.

In still another embodiment, one of the upper body shell, the under body shell and the front body shell, on which the most burdensome equipping process is needed, is supplied to a main equipping line.

In addition, the right and left ends of the front floor are joined with at least the right and left bearing portions of the side sills.

In another aspect of the present invention, a vehicle assembling method comprises steps of assembling a roof member with an upper body shell including a body side panel and right and left side sills, assembling lower body shell including under body portion having a front floor and front body portion, and assembling the upper body shell and the lower body shell, the improvement further comprising steps of forming bearing portions on right and left side sills of the upper body shell for bearing right and left ends of the under body portion, carrying forwardly the upper body shell and lower body shell to equipping lines and equipping the upper and lower body shells respectively, carrying the under body portion rearward in longitudinal direction of the vehicle relative to the upper body shell and engaging the right and left ends of the under body portion with the right and left bearing portions of the upper body shell and joining the right and left ends of the under body portion with the right and left lower ends of the upper body shell.

According to the present invention, the upper body shell and the lower body shell are assembled separately. Thereafter, the upper and lower body shells are joined together. In this process, the upper body shell and the lower body shell are introduced into the respective equipping lines to be equipped with fit-in parts. As a result, the workability and working efficiency can be improved in equipping process of both of the body shells.

Then, the under body portion is moved rearward relative to the upper body shell so that the right and left ends of the front floor are engaged and joined with the bearing portions of the right and left side sills. It will be understood that the under body is moved rearward to the upper body shell so that they are readily joined with each other. The front floor can be reliably and desirably engaged and joined with the upper body shell.

In another aspect of the present invention, after equipping the lower body shell integral witch the front body with fit-in-parts, the lower body shell is joined with the upper body shell. The equipping process can be advanced remarkably for the lower body shell. The lower body shell can be transferred by a separate line.

In still another embodiment, the front body separate from the under body are combined with each other. Then, both body portions are joined. The joined body portion is joined with the upper body shell. In this process, the equipping workability can be improved for both the under body portion and the front body portion. The burden in joining the upper body shell with the lower body shell can be reduced.

In another aspect of the present invention, after the under body portion and the front body portion which is separated from the under body portion are equipped with parts respectively, the front body portion and the upper body shell are joined with the under body portion. The workability of equipping the under body and front body portions can be improved. The upper body shell can be readily joined with the under body portion.

In still another aspect of the present invention, the most burdensome one of the upper body shell, under body and front body portions in equipping is introduced into the main equipping line. The main equipping line can be economically automated.

Alternatively, the right and left ends of the front floor is attached to at least the right and left bearing portions of the under body shell. In this method, the under body portion can be readily joined with the upper body shell improving the workability of the joining. The structure of joint portion thereof can be simplified with a desirable sealing.

In further aspect of the present invention, the upper body shell is formed with the right and left bearings at the lower ends thereof. The right and left ends of the under body portion are engaged with the bearing portions of the upper body shell. For example, the upper body shell is formed with a part of side sills as the bearing portions at the right and left lower ends thereof so as to bear the under body shell. Alternatively, the under body portion is formed with a part of the side sills as the bearing portions at the right and left ends thereof so as to bear the upper body shell.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
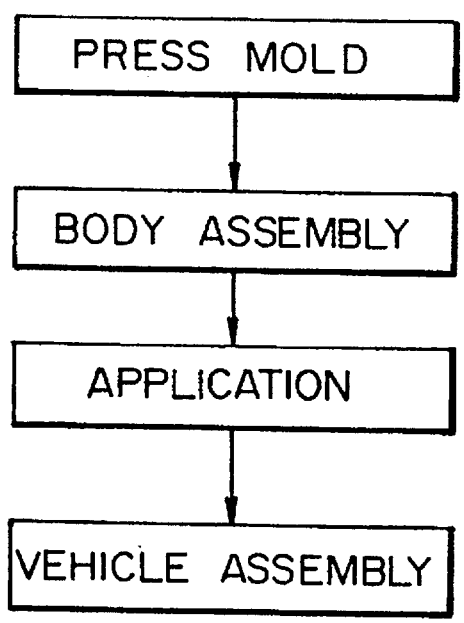
FIG. 1 is a flow diagram of vehicle assembling process.
Figure 2:
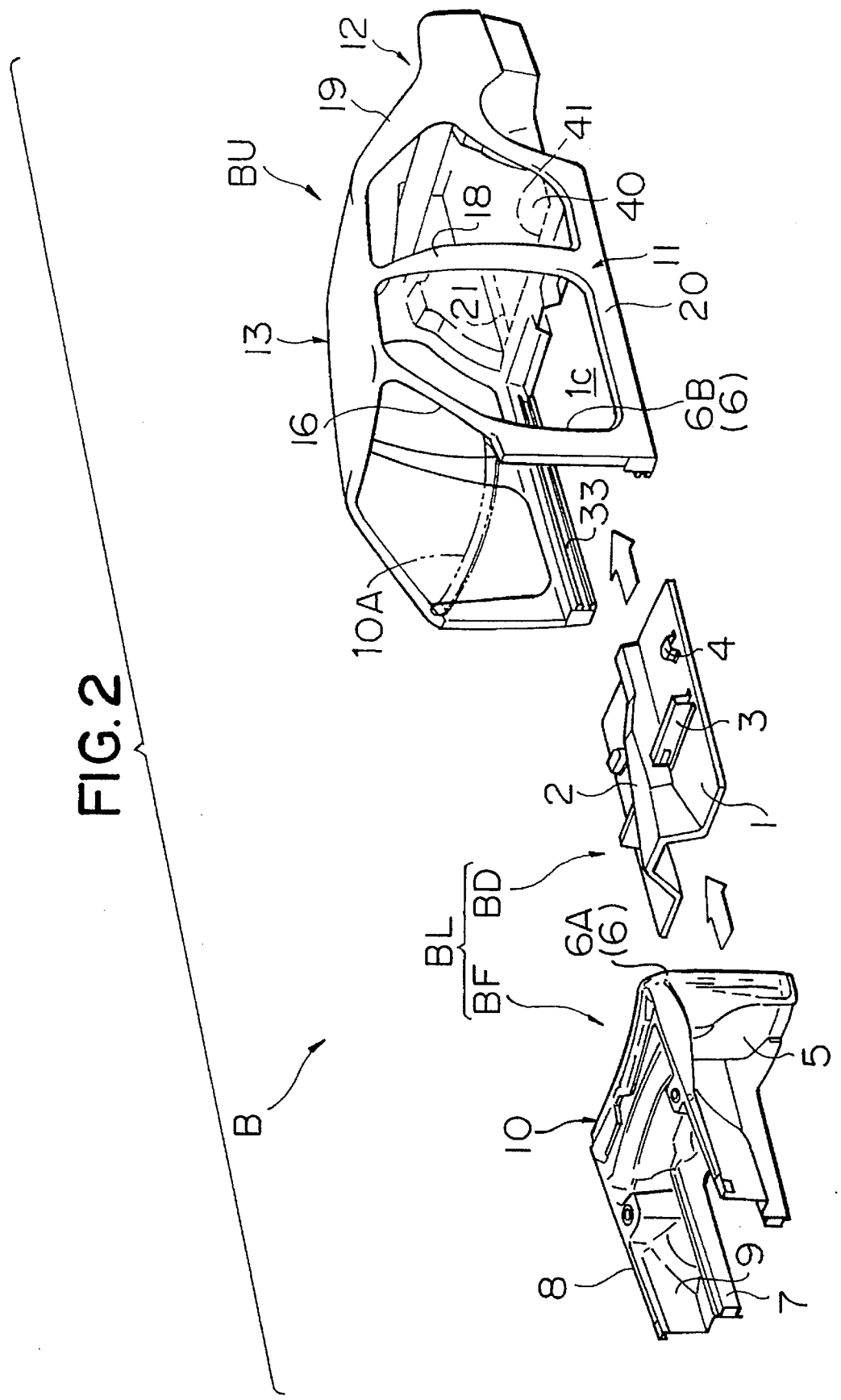
FIG. 2 is exploded perspective view of upper body shell, under body portion and front body portion.

As shown in FIG. 1, a vehicle assembling process includes press molding process, body assembling process, application process and vehicle assembling process. In the body assembling process, as shown in FIG. 2, upper body shell BU and lower body shell BL including under body portion BD and front body portion BF are assembled in the respective assembling lines. In the application process, the application process is made on the upper body shell BU and the lower body shell BL respectively. In the vehicle assembling process, the fit-in or equipping process is made on the upper body shell BU and the lower body shell BL. Thereafter, the under body portion BD and the front body portion BF are moved rearward in a longitudinal direction of the vehicle relative to the upper body shell BU to be joined with each other to assemble a body shell B on which a unit 160 is mounted. The press molding process is well known to the skilled in the art. Therefore, detailed explanation is omitted.

Figure 3:
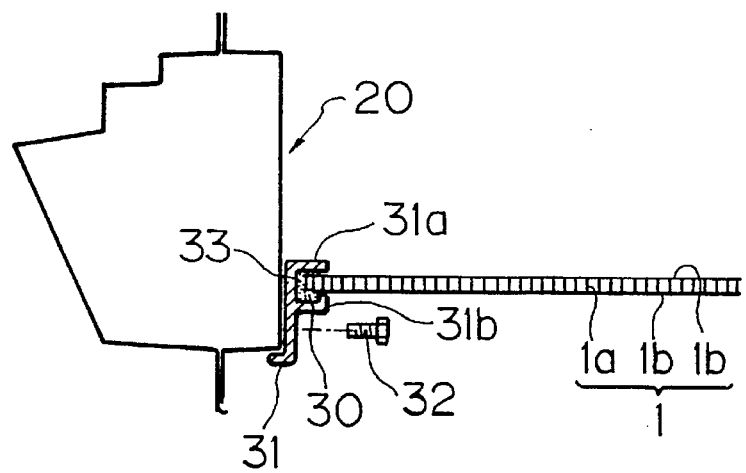
FIG. 3 is a sectional view of a joint structure of a side sill and front floor.

Referring to FIGS. 2 through 19, the under body portion BD includes front floor 1, right and left front frames, shaft tunnel 2, second cross member 3, right and left seat bracket 4 and the like. As shown in FIG. 3, the front floor 1 includes a honeycomb base plate 1a of aluminum or aluminum alloy and upper and lower plates 1b of aluminum or aluminum alloy attached to the upper and lower sides of the base plate 1a. The upper and lower plates 1b can be made of steel.

Figure 15:
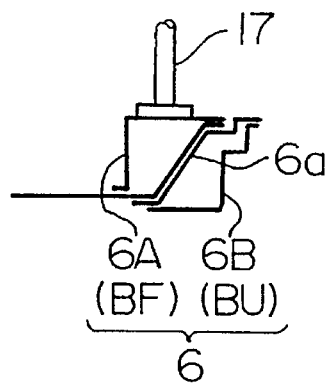
FIG. 15 is a sectional view along a line 15—15 in FIG. 14.
Figure 16:
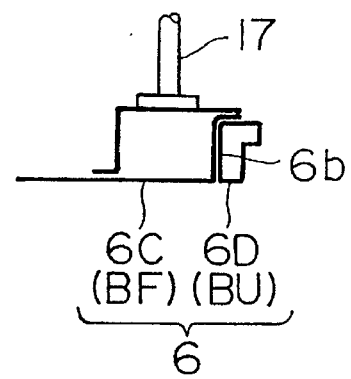
FIG. 16 is a similar view to FIG. 15 but showing another structure.

Front body portion BF includes right and left front side frames 7, wheel apron 9, cowl dash structure 10, dash lower panel 5, closed cross-sectioned structure 6A forming a front portion of hinge pillar 6 (see FIG. 15).

Upper body shell BU includes body side panel 11 for forming a vehicle side structure, rear body 12 for forming a rear body portion, and roof panel 13 for forming a vehicle upper portion. The body side panel 11 includes side outer panel 14 and side inner panel 15 which form a front pillar 16 of a closed cross sectioned structure, a closed cross section 6B forming a front portion of hinge pillar 6, center pillar 18, rear pillar 19, right and left side sills 20 and the like. The rear body 12 includes rear floor, main center floor 40, right and left rear frame 21, third cross member 41, fourth cross member and the like.

As shown in FIG. 3, the inner side of the side sill 20 is formed with bearing member 31 of aluminum or aluminum alloy which is formed by extrusion molding is disposed from front end to rear end of the side sill 20. The bearing member 31 is fixed to the side sill 20 by means of bolt 32 or welding. The bearing member 31 is formed with upper and lower bearing portions 31a, 31b extending inwardly. There is formed engaging groove 33 defined by the bearing portions 31a, 31b and extended across the side sill 20 for receiving right and left ends of the front floor 1. The front floor 1 is slid into the right and left grooves 33 so that the under body portion BD is assembled with lower portion of the upper body shell BU. In this case, adhesive is applied onto the grooves 33 prior to the assembly of the under body portion BD. Sealing effects can be obtained. The adhesive can be applied after insertion of the front floor 1 into the grooves 33. Bolts can be employed for fixing the front floor 1 to the upper body shell BU. The front floor 1 may be made of fiber reinforced synthetic resin.

Figure 4:
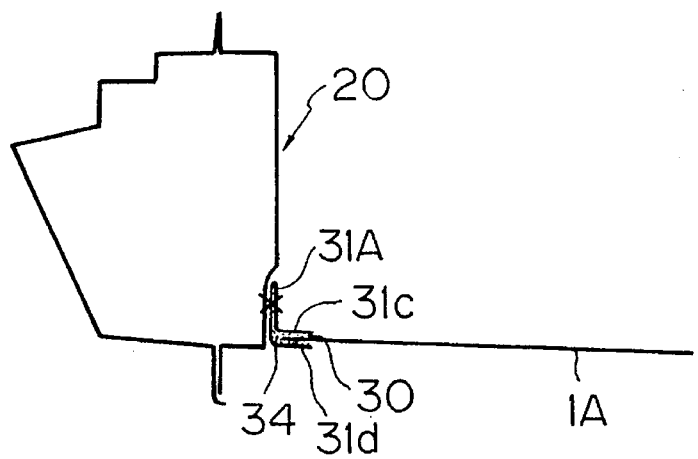
FIG. 4 is a similar view to FIG. 3 but showing another structure.
Figure 5:
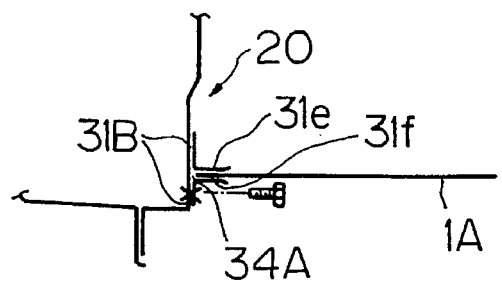
FIG. 5 is a similar view to FIG. 3 but showing still another structure.

When the front floor 1 is made of steel front floor 1A, as shown in FIG. 4, a L-shaped bearing member 31A is fixed to lower and inner portion of the side sill 20 by means of bolts or welding to form a groove 34 between bearing portions 31c and 31d. Alternatively, as shown in FIG. 5, upper and lower L-shaped bearing members 31B are fixed to the inner and lower portion of the side sill 20 so as to form engaging groove 34A therebetween to which the front floor 1A is inserted.

Figure 6:
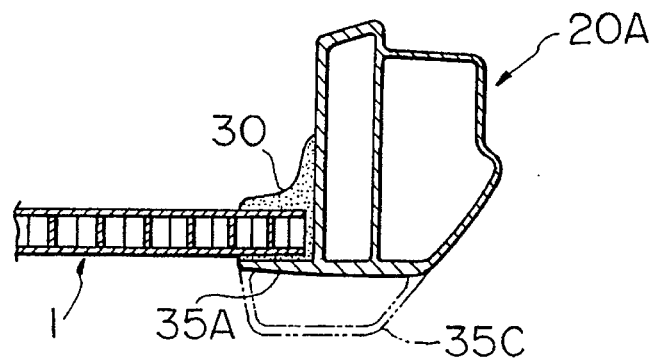
FIG. 6 is a similar view to FIG. 3 but showing further structure.

As shown in FIG. 6, the side sill 20A is formed at the inner lower ends of the side sill 20A with a bearing portion 35A projected horizontally and inwardly and extended from front end to rear end for bearing one of the right and left ends of front floor 1. The front floor 1 is inserted into the bearing portion 35A and fixed thereto by means of bolt or welding. In this case, as shown by a phantom line, a reinforcement 35C forming closed-cross sectioned structure may be provided integrally on the side sill 20A.

Figure 7:
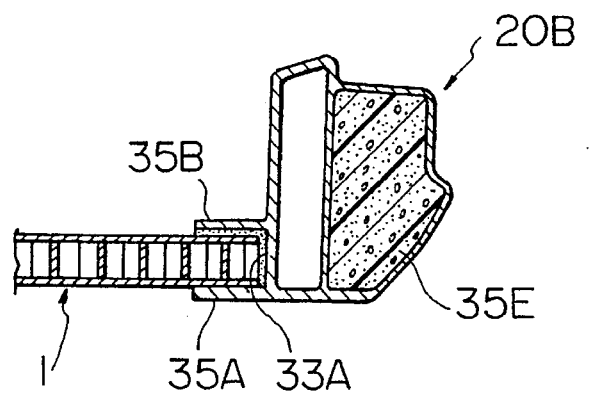
FIG. 7 is a similar view to FIG. 3 but showing a still further structure.

As shown in FIG. 7, side sill 20B is formed with a bearing portion 35B on the intermediate portion in parallel with the bearing portion 35A to form engaging groove 33A between the bearing portions 35A and 35B for receiving the front floor 1 which is fixed to the side sill 20B by means of bolt or welding or the like. Polyurethane foam 35E is filled in the inner space of the closed cross sectioned structure defined by the side sill 20B.

Figure 8:
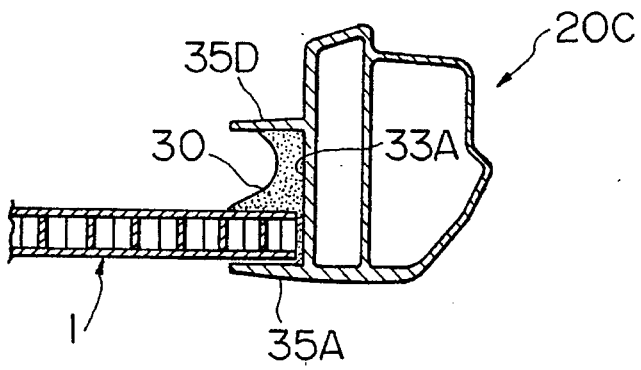
FIG. 8 is a similar view to FIG. 3 but showing yet another structure.

As shown in FIG. 8, adhesive 30 may be filled between bearing portion 35D and the front floor 1. In this case, distance between the two bearing portions 35A and 35D are broadly provided.

Figure 9:
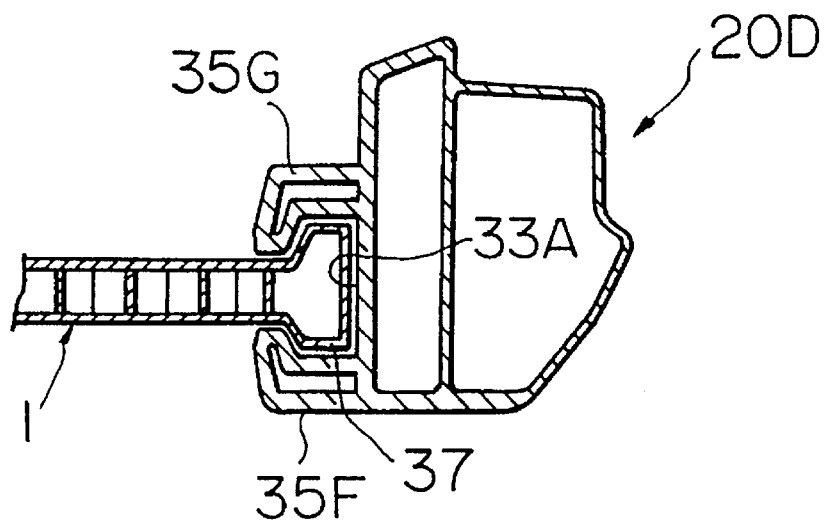
FIG. 9 is a similar view to FIG. 3 but showing another structure.

Alternatively, as shown in FIG. 9, side sill 20D is formed at inner lower and middle portions with bearing portions 35F and 35G of closed cross-sectioned structures. Engaging groove 33A is formed between the bearing portions 35F and 35G. The width of the groove 33A becomes gradually broader toward the bottom thereof. Adhesive 30 is filled in the engaging groove 33A. Thereafter, the under body portion BD is joined with the upper body shell BU.

Figure 10:
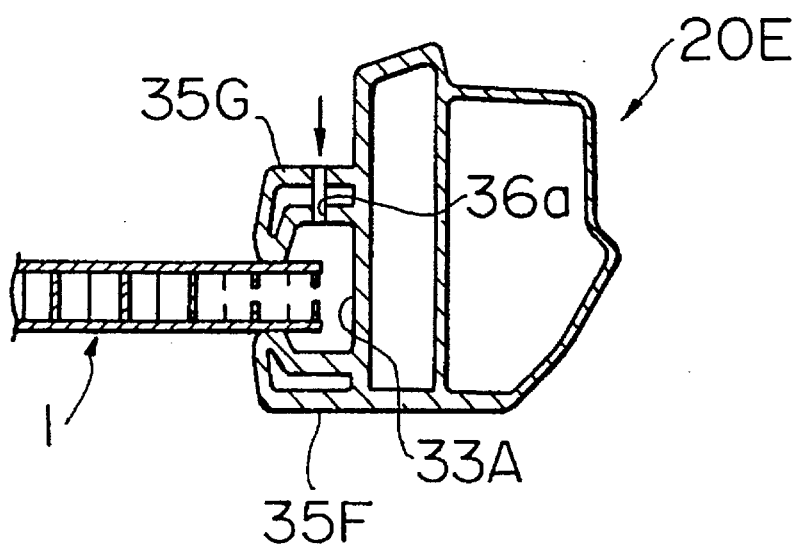
FIG. 10 is a similar view to FIG. 3 but showing yet further structure.
Figure 11:
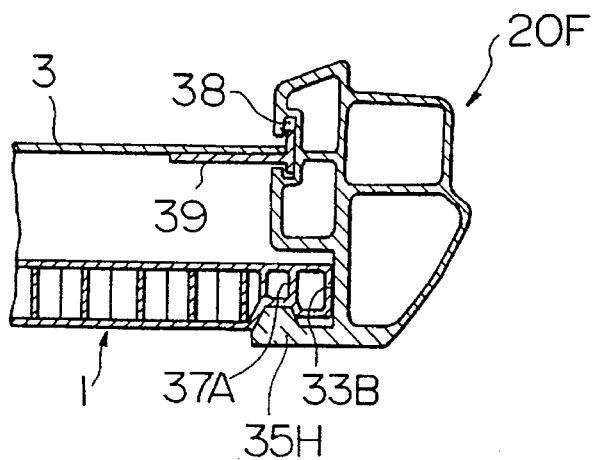
FIG. 11 is a similar view to FIG. 3 but showing a further structure.
Figure 12:
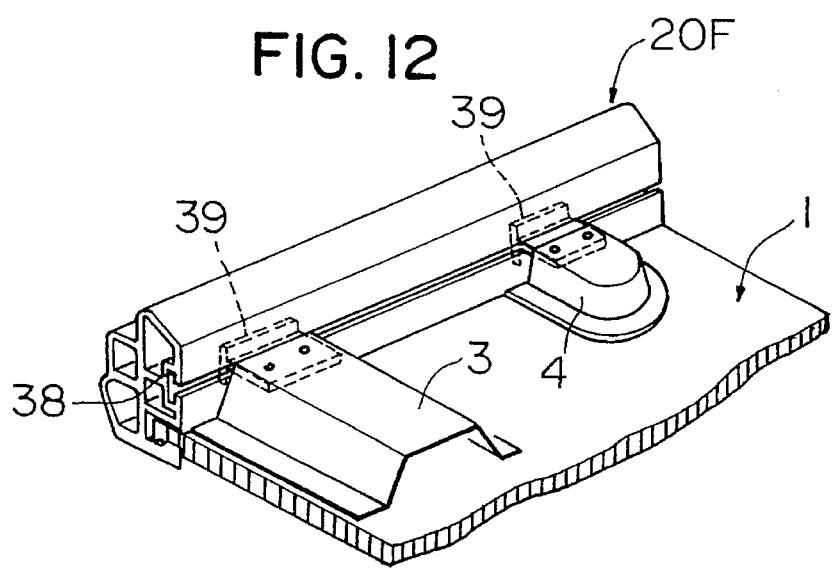
FIG. 12 is a perspective view showing side sill and front floor.
Figure 13:
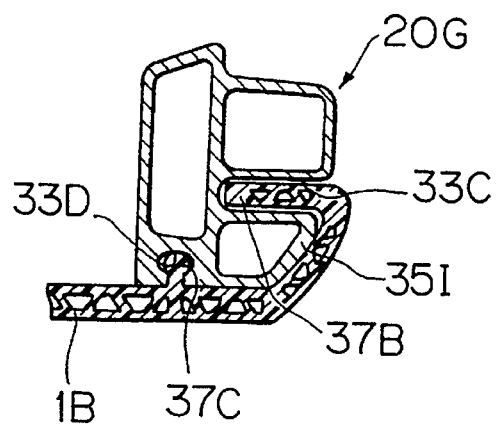
FIG. 13 is a similar view to FIG. 3 but showing another structure.

As shown in FIG. 10, it is also preferable that a plurality of through holes 36a with a certain interval are provided on the bearing portion 35G which communicate with inside of the groove 33A. In this structure, when the front floor 1 is inserted into the engaging groove 33A, the adhesive 30 is introduced into the groove 33A for fixing the upper body shell BU and the under body shell BD through the side sill 20E. As shown in FIGS. 11 and 12, side sill 20F is formed at inner and lower portions thereof with engaging groove 33B and bearing portion 35H. The side sill 20F is also formed at inner and upper portion thereof with T-shaped engaging groove 38. Engaging portion 37A of the front floor 1 is engaged with the engaging groove 33B so that the bearing portion 35H supports the front floor 1. The outer end of the second cross member is joined with the side sill 20F through engaging member 39 which is received by the engaging groove 38. As shown FIG. 13, side sill 20G is formed at middle and lower outer portions thereof with engaging grooves 33C and 33D with which engaging portions 37B and 37C formed at outer end portions of the front floor 1 made of FRP so that bearing portion 35I supports the front floor 1. The third cross member 41 is formed at front end portion with a flange portion extending in the transverse direction of the vehicle. The front floor 1 which is engaged with the upper body shell BU is engaged with the front flange of the third cross member 41 at rear end portion by means of adhesive or bolt. Alternatively, the third cross member 41 is provided with bearing member constituted by a channel member along the rear end of the front floor 1 so that the rear end of the front floor 1 is engaged and fixed with groove defined by the bearing member through adhesive or bolts.

Figure 14:
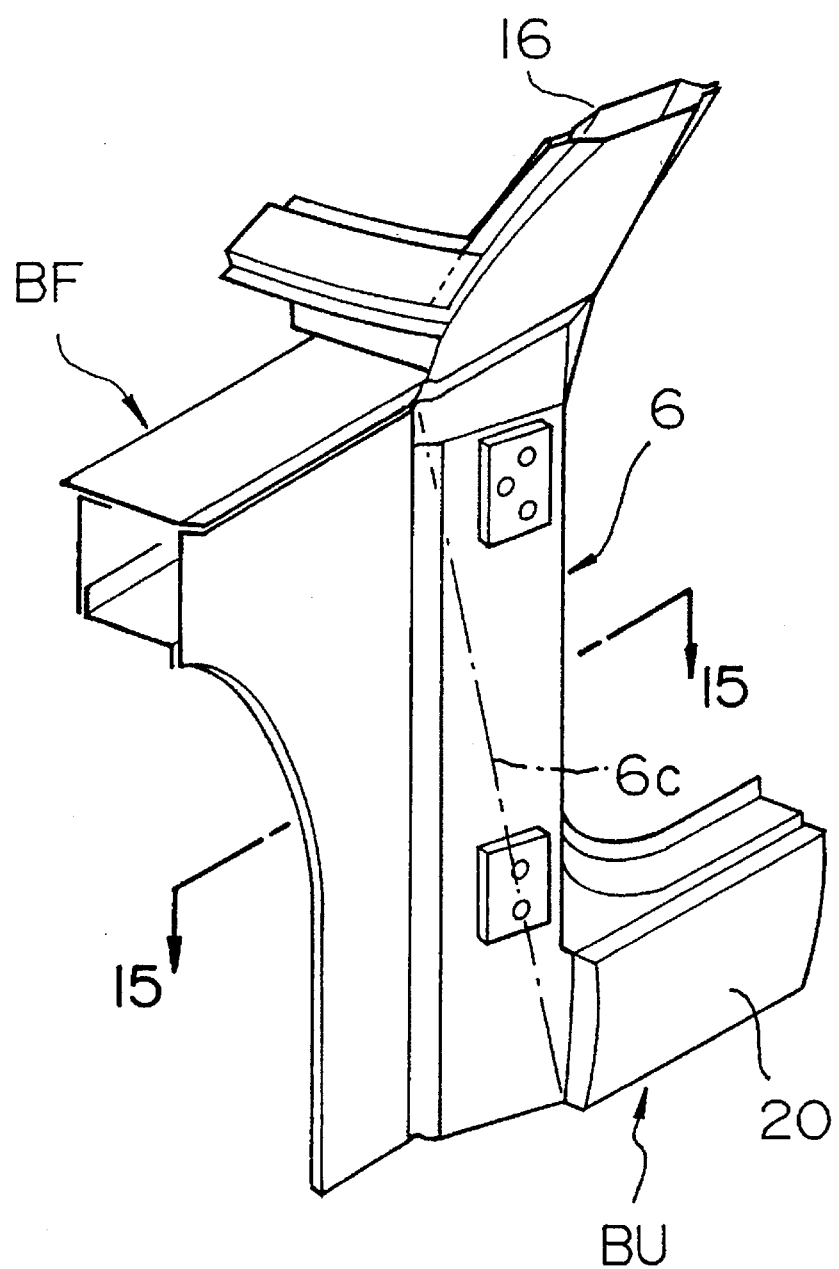
FIG. 14 is a perspective view of an essential portion of joint structure of the hinge pillar.

Referring to FIGS. 14 and 15, there are provided a pair of closed cross sectioned structures 6A and 6B having split surfaces 6a, which form a hinge pillar 6. As shown in FIG. 2, the front body portion BF is assembled with the upper body shell BU wherein the closed cross sectioned structures 6A and 6B are joined. The front body portion BF and the upper body shell BU are formed with the closed cross sectioned structures 6A and 6B respectively. This enhances the strength and rigidity of the respective members BF and BU.

Reference 17 shows a reinforcement of instrument panel. The reinforcement 17 is joined with the closed cross sectioned structure 6A of the front body portion BF. Alternatively, the hinge pillar 6 can be separated by split surfaces 6b extending transversely to form a pair of closed cross sectioned structures 6C and 6D.

Figure 17:
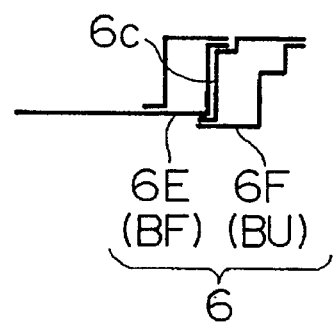
FIG. 17 is a similar view to FIG. 15 but showing still another structure.
Figure 18:
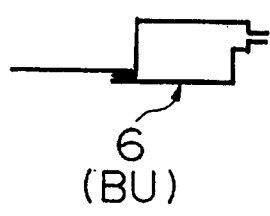
FIG. 18 is a similar view to FIG. 15 but showing another structure.
Figure 19:
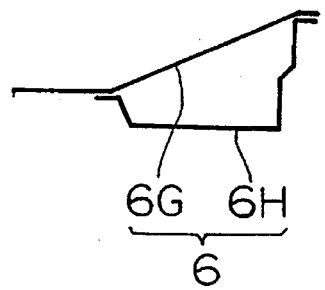
FIG. 19 is a similar view to FIG. 15 but showing another structure.

As shown in FIGS. 17 and 14, the hinge pillar 6 is divided by split surfaces 6c into closed cross sectioned structures 6E and 6F in the body structures BF and BU. The split surfaces 6c extends transversely and forwardly downwardly. As shown in FIG. 18, the hinge pillar can be formed on the upper body shell BU. Alternatively, as shown in FIG. 19, hinge pillar inner 6G is formed on the front body portion and hinge pillar outer 6H is formed on the upper body shell BU so that the hinge pillar 6 is formed when the front body portion BF is joined with the upper body portion BU. Where the side sill as shown in FIGS. 6 through 11 is used, a lower end of the hinge pillar 6 is fixed to the side sill through bolt and the like.

The front body portion BF is formed with transverse flange portion at the rear end portion of the dash lower panel. The front floor 1 is engaged with the flange portion of the front body portion BF and fixed thereto by means of the adhesive and bolts. Alternatively, the front floor 1 is provided with transverse bearing member of a channel structure in section along the front end thereof. The bearing member defines engaging groove with which the front end portion of the front floor 1 is engaged and fixed by means of the adhesive and bolts.

Body Assembling Process

The upper body shell BU and the under body portion BD and front body portion BF are assembled in respective assembling lines.

The upper body shell BU is assembled in upper body shell assembling line BUL. The assembling line BUL includes nine stations S1–S9 to which assembling fixture JU is transferred in order. On the fixture JU are assembled body members with an inner panel which is a reference member so that upper body structure BU is assembled. A plurality of fixtures are prepared for respective kinds of vehicles and placed at fixture station ST. A conveyor can be constituted by a linear system or a lift and carry system which are conventionally known.

Referring to FIGS. 21 through 24, the fixture JU includes pallet P, RF retainer for positioning and rear body 12, right and left SP retainer for positioning and fixing side panel 15, RH retainer for positioning and fixing front header 22 and rear header 23 of the roof panel 13.

The pallet is provided with right and left brackets 45 spaced longitudinally from each other at the rear end. The bracket 45 is provided with positioning pin 46 and clamp C1. Right and left rear frames 21 of the rear body 12 are positioned at four points in the front and rear ends by means of four positioning pins 46 so as to be positioned and fixed to the pallet P through the clamp C1.

The SP retainer is provided for positioning and fixing right and a left side panels 15. The SP retainer is provided at a right side and a left side. Stationary base 47 is disposed at the left side of the pallet P. Supporting plate 48 is disposed on the stationary base 47 for transverse movement. The supporting plate 48 is provided with F-shaped support frame 49 having a pair of front and rear vertical columns 49a on which clamps C2 are mounted for an inner roof rail formed at an upper end portion of the side inner panel 15. The support plate 48 is provided with positioning device P1 for positioning a middle portion of center pillar inner 18A and clamp C3 for fixing the middle portion of the center pillar inner 18A. Horizontal member 49b of the support frame 49 is provided at a rear end portion with positioning device P2 for positioning lower end of rear inner 19A of the side inner panel 15 and clamp C4 for fixing the rear pillar inner 19A.

On pallet P in front of the stationary base 47 is disposed support base 50 on which a movable plate 51 is disposed for transverse movement. On the movable plate 51 is disposed a vertical column 52 on which channel-like support frame 53 is mounted. On the support frame 53 is provided positioning device P3 for positioning hinge pillar inner 17A of the side inner panel 15 and a pair of upper and lower clamps C5. The left side inner panel 15 is positioned through the devices P1 through P3 and fixed by means of the clamps C2 through C5.

As for the RH retainer, between the right and left stationary bases are disposed a pair of vertical columns 54. Support frame 55 is disposed between the upper portions of the vertical columns 54. At a pair of front arms 55a of the support frame 55 is provided positioning device P4 and clamp C6 for positioning and fixing the both end portions of the front header 22 respectively. At rear ends of biforked arm portions 55b of the support frame 55 are provided positioning device P5 and clamp C7 for positioning and fixing transverse end potions of the rear header 23. Front header 22 is positioned and fixed to the pallet P through the pair of positioning devices P5 and clamp C6 whereas the rear header 23 is positioned and fixed to the pallet P through positioning device P6 and clamp C7. There is provided positioning device P6 and clamp C8 at each end of a pair of arm portions 55c provided at middle portion of the support frame 55 for positioning and fixing opposite end portions of roof bow 24.

Figure 24:
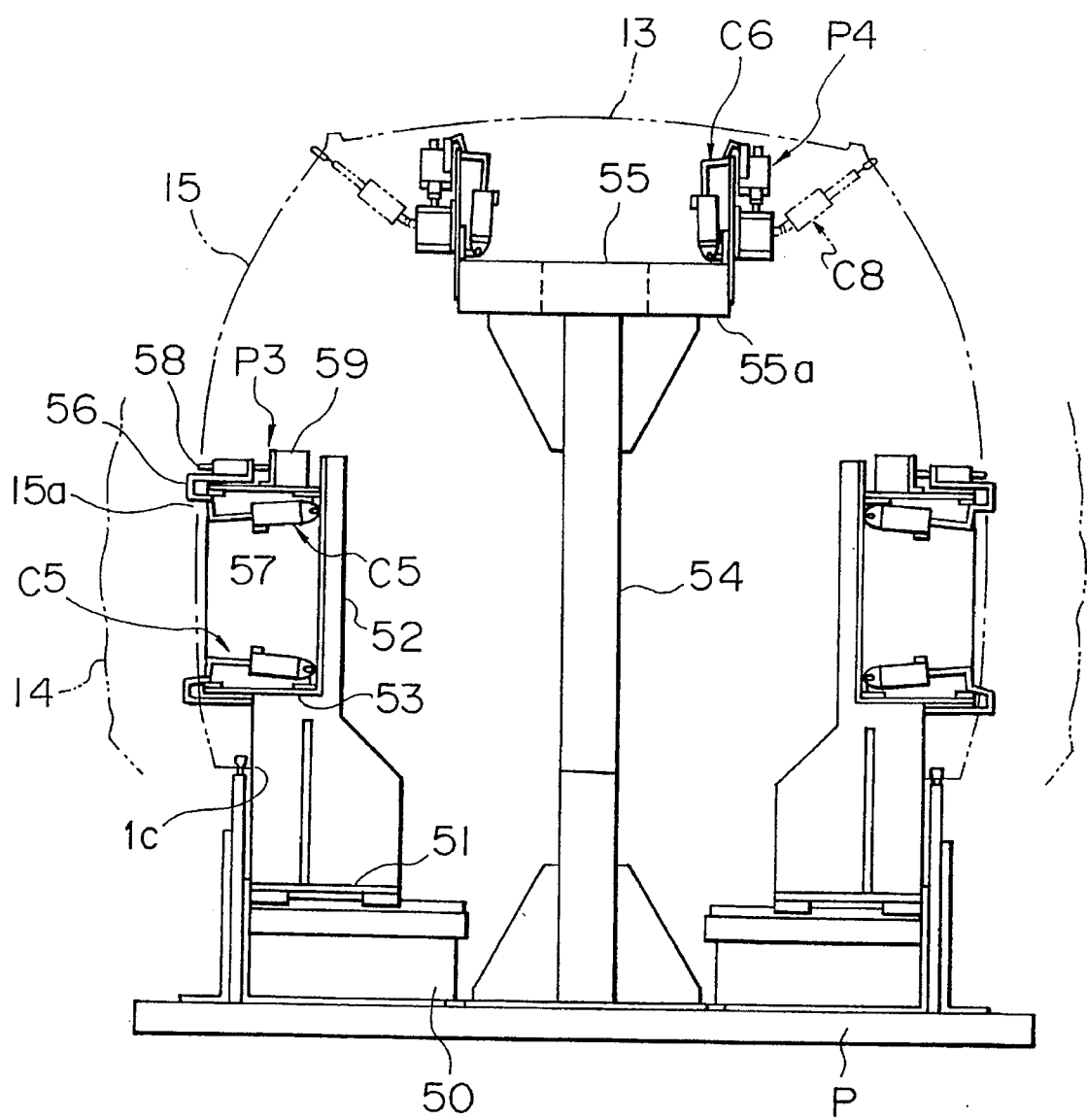
FIG. 24 is a front view of the assembling fixture.

As shown in FIG. 24, the clamps C1 through C8 are constituted by toggle clamps including crank like clamp lever 56 and air cylinder 57 for driving clamp lever 56. The positioning devices P1 through P6 are conventionally known and provided with air cylinder 59 for driving positioning pin 58 for reciprocating movement. As shown in FIG. 24, the SP retainer inserts the clamp 45 of the clamp C5 through opening 15a of the side inner panel 15 and clamp the side inner panel 15.

Figure 23:
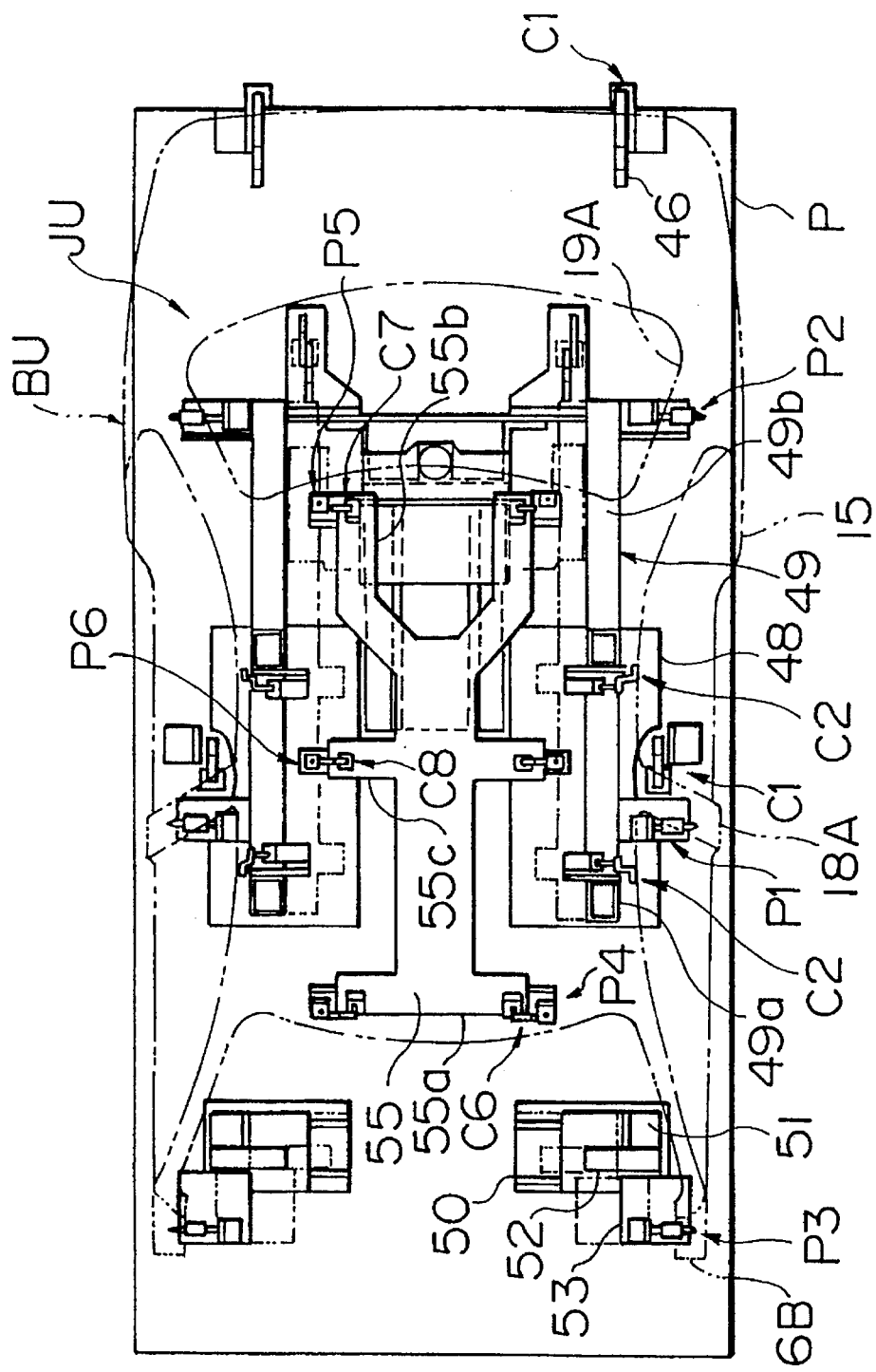
FIG. 23 is a plan view of the assembling fixture.

The clamps C2 through C4 and positioning devices P1 and P2 are transferred to the assembling station as shown by real lines in FIG. 23 through the support plate 48 and the support frame 49 and the clamp C5 and positioning device P3 are transferred to assembling station through the vertical column 52 and movable plate 51 when the body member is assembled with the fixture JU. After the upper body structure is assembled, the clamps C2 through C4 and positioning devices P1 and P2, the clamp C3 and positioning device P3 are moved to a retracted position as shown by phantom lines so as to retract the fixture JU from the opening 1c (see FIG. 24). In this case, the front floor is not mounted yet.

Figure 20:
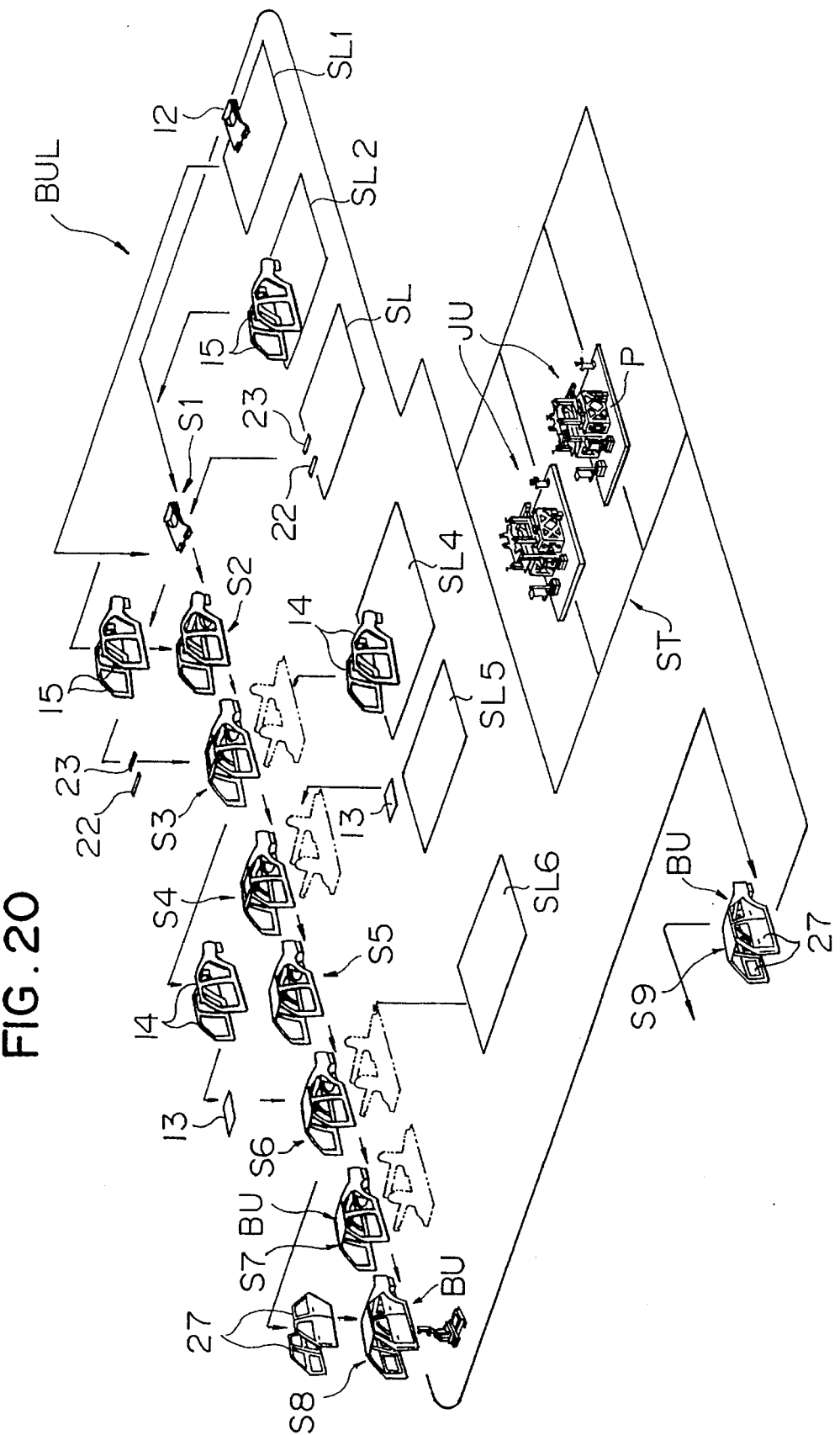
FIG. 20 is a perspective view showing a body assembling line.
Figure 25:
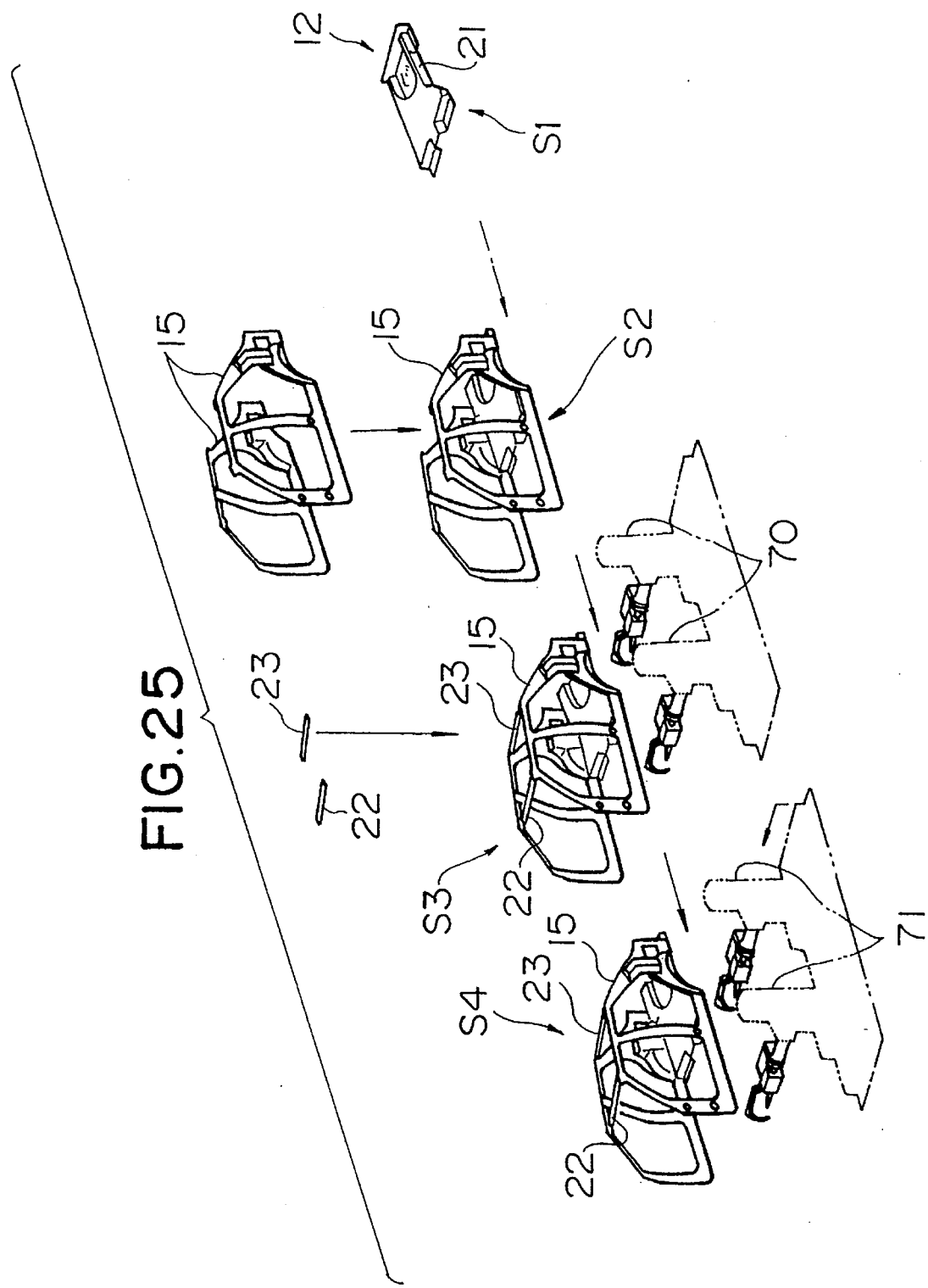
FIG. 25 is a perspective view for explaining a body assembling process.

In the body assembling line BUL, as shown in FIGS. 20 and 25, the rear body 12 is assembled in first sub-line SL1. The side panel 15 includes inner panel body, roof rail inner, impact bracket, wheel house and suspension reinforcement and is assembled in second sub-line SL2. The front and rear headers 22 and 23, as roof inner member of the roof panel, include header inner panels and header outer panels respectively and are assembled in third sub-line SL3. The side outer panel 14 includes an outer panel body, a front hinge reinforcement, a rear hinge reinforcement, a center pillar reinforcement, a rear striker reinforcement and a corner plate and is assembled in fourth sub-line SL4.

The roof panel 13 includes an outer panel body and roof bow 24 and is assembled in fifth sub-line SL5. Bonnet 25 and trunk lid 26 are assembled in separate sub-lines (not shown). Four side doors 27 include a door inner panel, a door outer panel and a sash and are assembled in sixth sub-line SL6.

Next, there is described an assembling process for the upper body shell BU making reference to FIGS. 20 and 25 through 28. The upper body shell BU is assembled in a manner so that body members are mounted on the fixture JU as the fixture JU is transferred around stations S1 through S9 of the body assembling line BUL.

Figure 21:
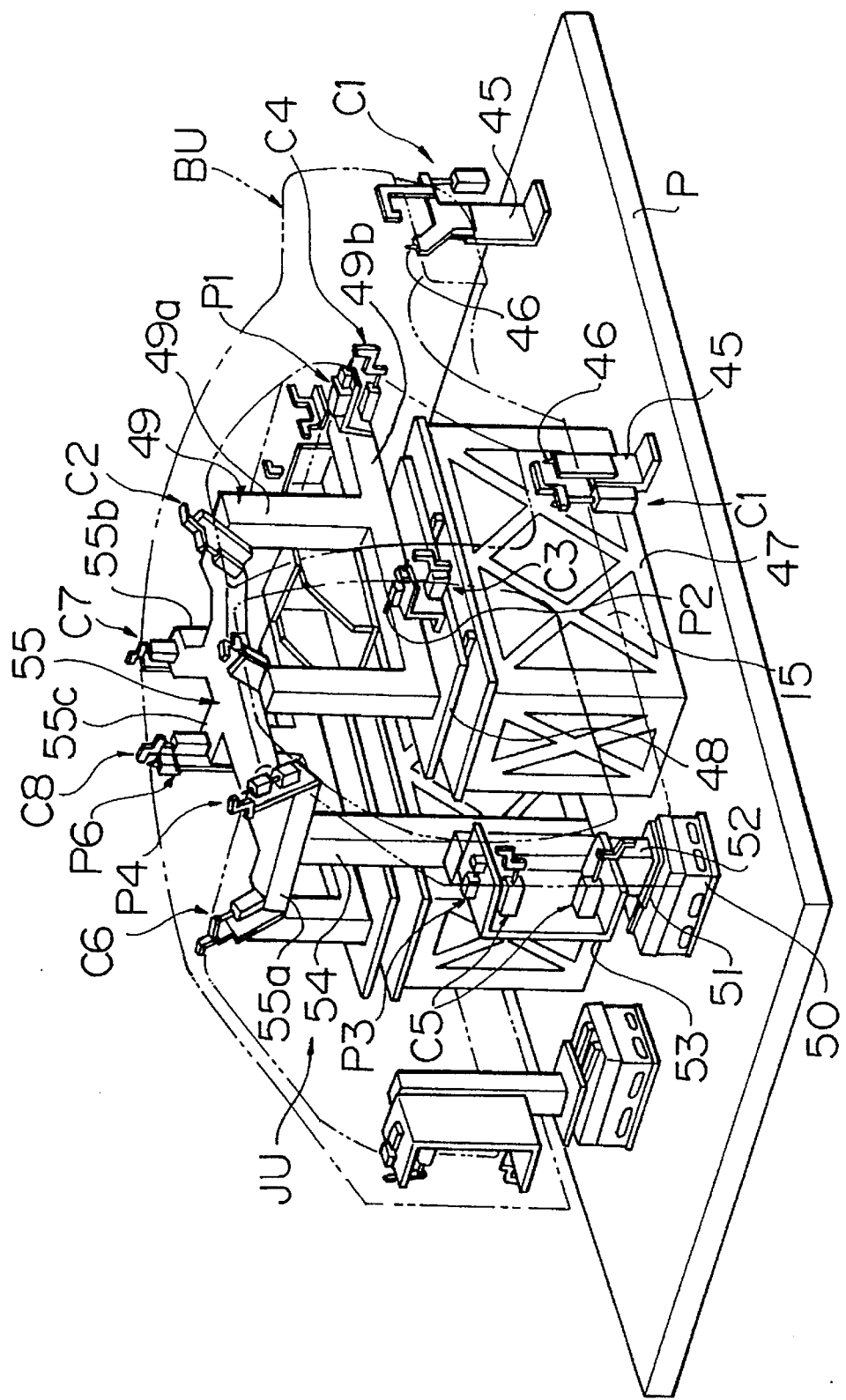
FIG. 21 is a perspective view of an assembling fixture.

In first station S1, as shown in FIG. 25, the rear body 12 is supplied from the first sub-line SL1 and fixed to the fixture which is transferred from the fixture storing station ST and positioned. In this case, the rear body 12 is positioned and fixed to the fixture JU through the four positioning pins 46 and four clamps C1 as shown in FIG. 21.

In second station, as shown in FIG. 25, the right and left side panels 15 are supplied from the first station S1 and fixed to the fixture JU which is positioned there. In this case, the right and left side inner panel 15 are positioned and fixed to the fixture JU by means of the positioning devices P1 through P3 and clamps C2 through C5.

Figure 27:
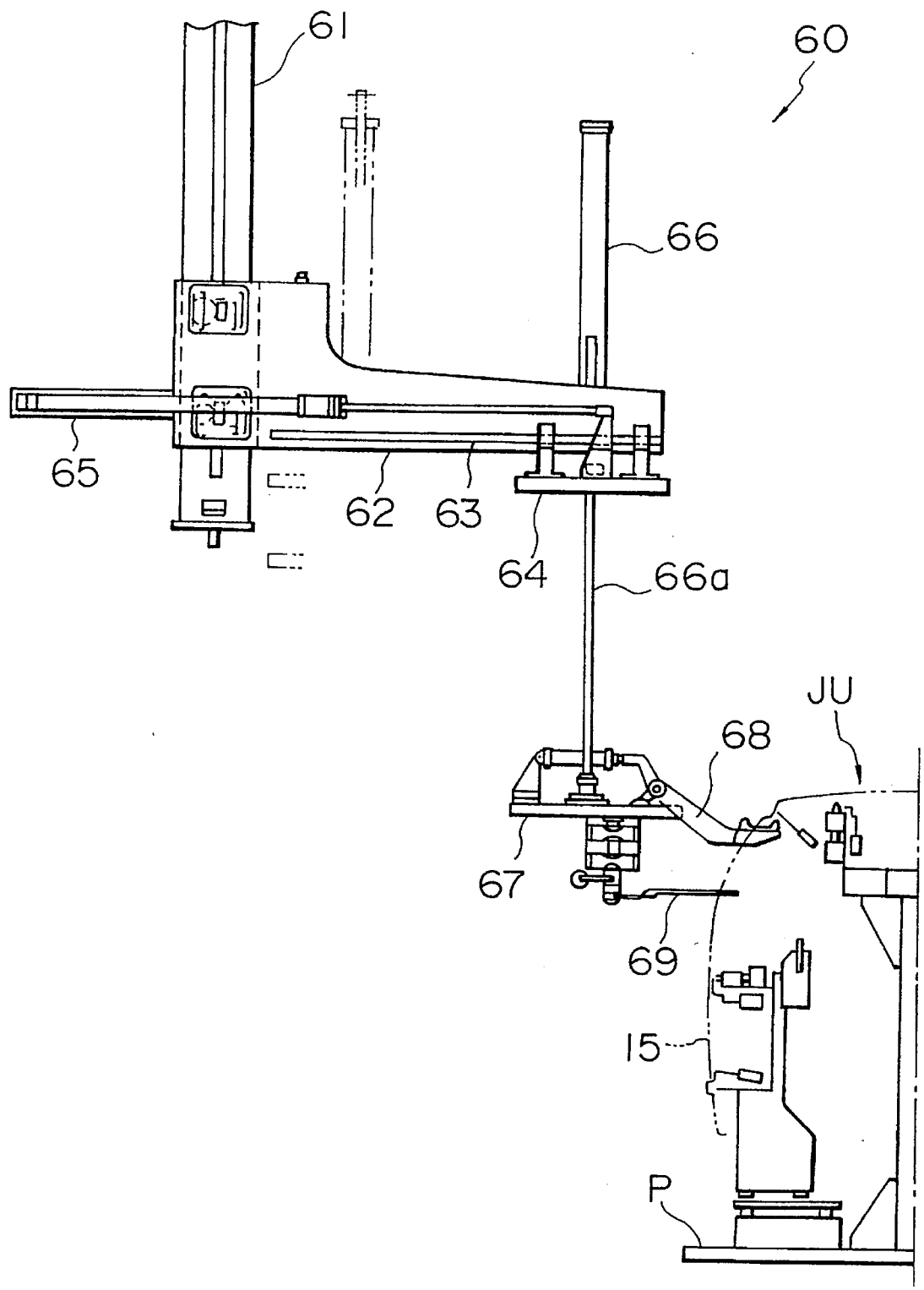
FIG. 27 is a front view of a conveying device.

There is provided a conveyor 60 for conveying the side panel 15 to the second station S2. As shown in FIG. 27, across a downstream and upper end of the second supply line SL2 and an upper portion of the second station is diposed a guide rail (not shown) which supports a pair of right and left vertical frames 61 for up and down movement. The frames 61 support lift arm 62 as a cantilever for up and down movement, which is driven by a lift drive mechanism which is provided close to the upper end of the vertical frame.

Beside the lift arm 62 is a guide rail 63 which bears a base plate 64 which is moved tranversely by means of cylinder 65. On the base plate 64 is disposed upright cylinder 66 which includes a movable plate 67 at a lower end of the piston rod 66a. The movable plate 67 is provided with support arm 68 and stopper arm 69 which can be inserted from the door opening of the side inner panel 15 which is held by the support arm 68 and the stopper arm 69.

In the third station S3, as shown in FIG. 25, the front and rear headers 22 and 23 from the third sub line SL3 are positioned and fixed to the fixture JU. In this case, the headers 22 and 23 are positoned by the positioning devices P4 and P5 and clamps C6 and C7. Thereafter, opposite ends of the headers 22 and 23 are joined with the right and left inner panels 15 by tack welds utilizing welding robot 70 disposed in the third station S3. The side inner panels 15 are joined with the rear body 12 by tack welds.

In the fourth station S4, as shown in FIG. 25, aditional welding is applied on joint portions of the side inner panel 15, rear body 12 and headers 22 and 23 by two welding robots 71.

Figure 26:
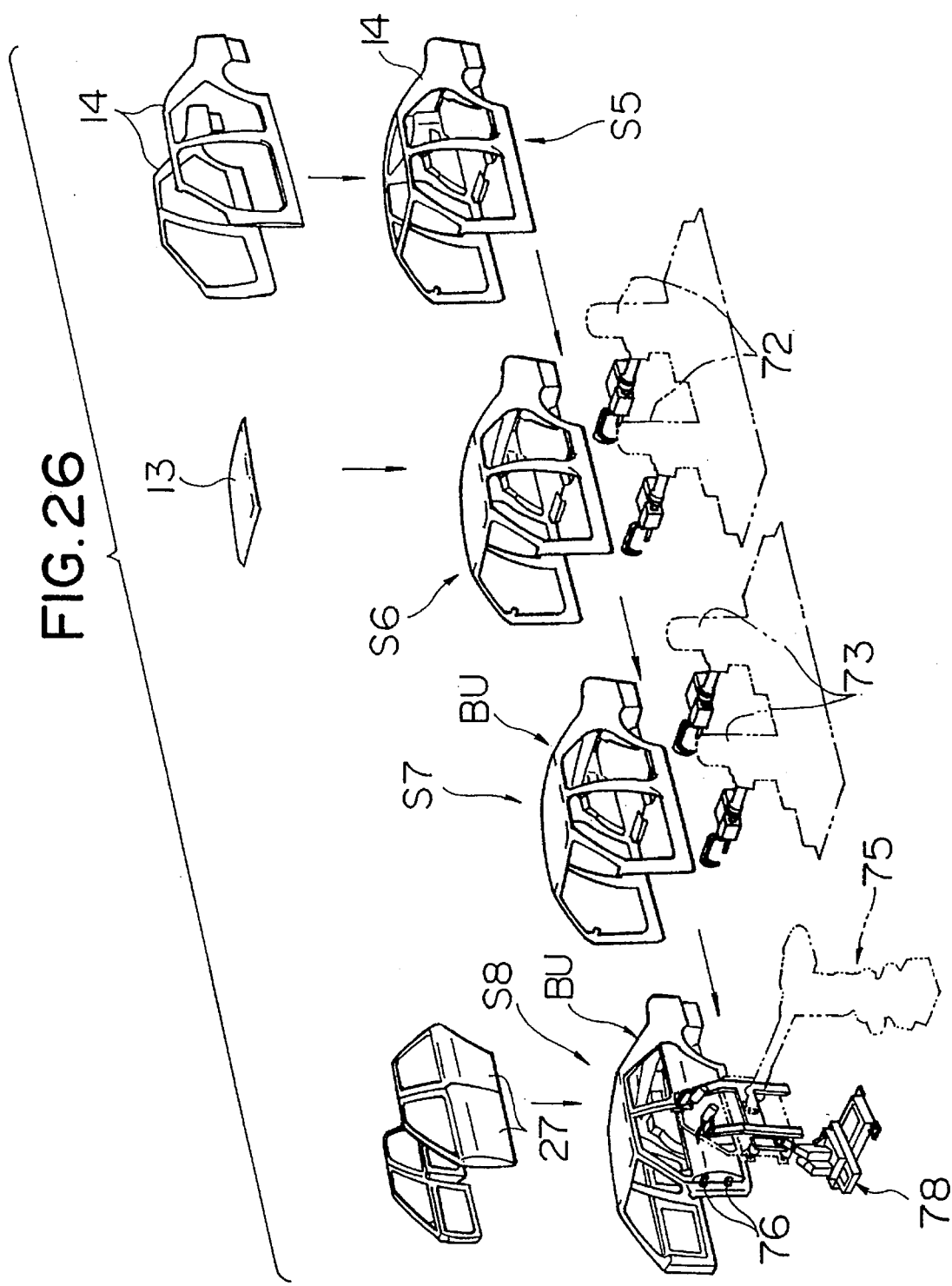
FIG. 26 is another perspective view for explaining a body assembling process.

In the fifth station S5, as shown in FIG. 26, right and left side outer panels 14 from the fourth subline SL4 are supplied, positioned and fixed to the right and left side inner panels 15 which are already fixed to the fixture JU.

Figure 22:
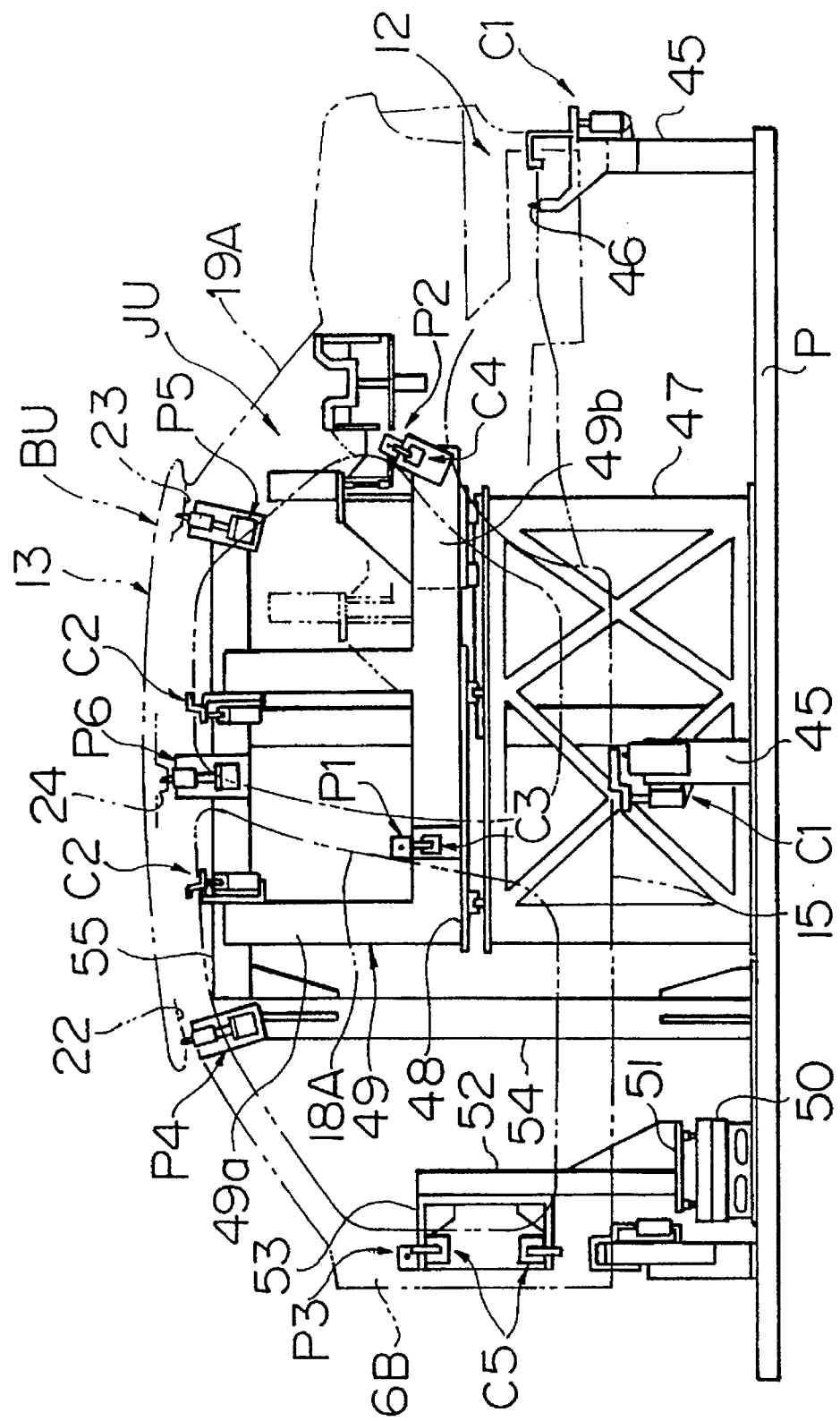
FIG. 22 is an elevational view of the assembling fixture.

In the sixth station S6, as shown in FIG. 26, roof panel 13 from the fifth subline SL5 is supplied, positioned and fixed to the fixture JU. As shown in FIG. 22, roof panel 13 is positioned and fixed by means of the positioning device P6 and clamp C8. Thereafter, the side outer panel 14 is welded to the side inner panel 15 by tack weld and the roof panel 13 is welded to the front and rear headers 22 and 23, side outer panel 14 by tack welds.

In seventh station S7, as shown in FIG. 26, body members welded by tack welds in the sixth station S6 is welded additionally by two welding robots 73.

Figure 28:
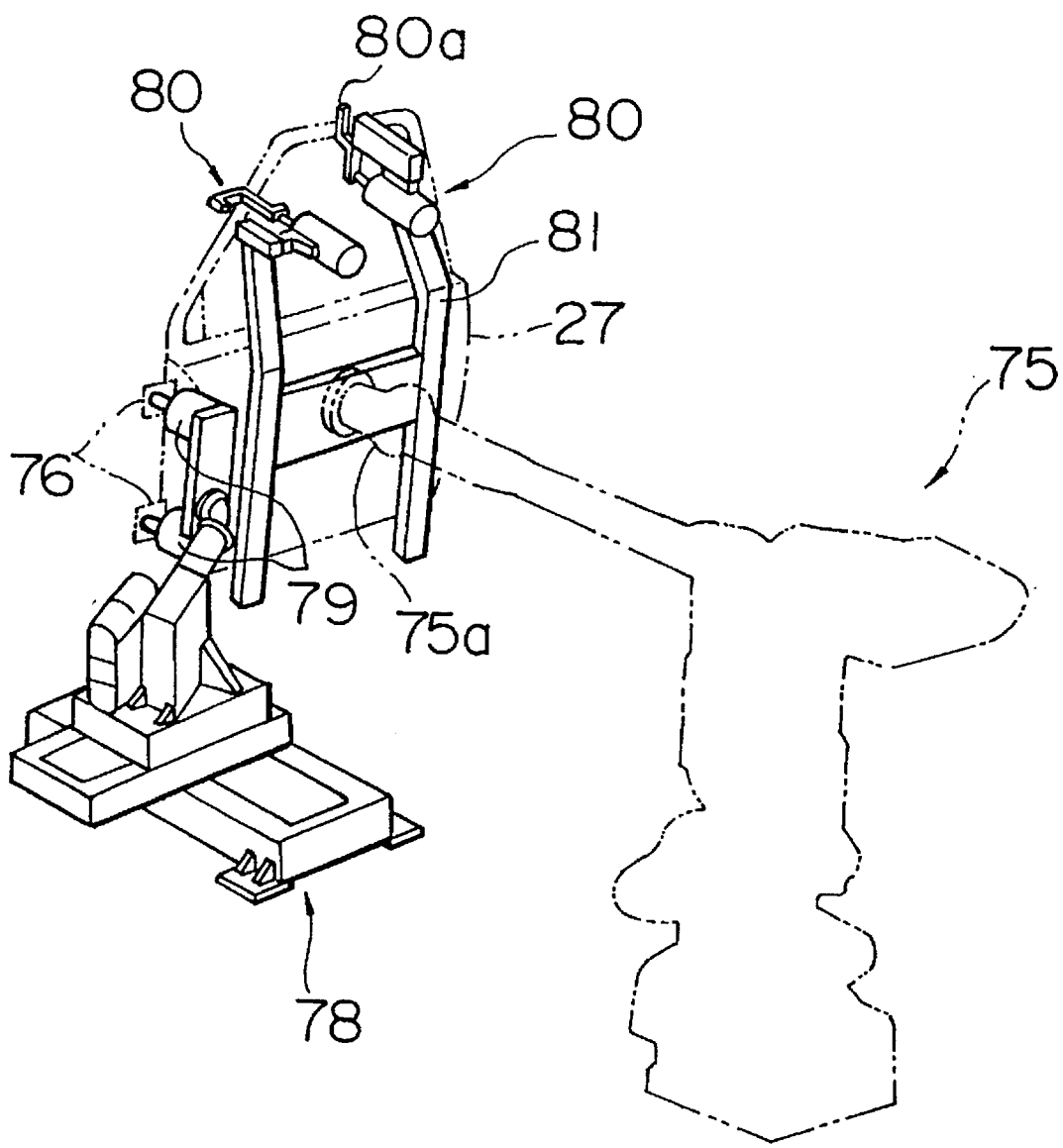
FIG. 28 is a perspective view of a door supply robot and joining device.

In eighth station S8, as shown in FIGS. 26 and 28, front and rear side doors 27 are supplied by a pair of robots 75 from the sixth subline SL6, in order, and provisionally joined with the side outer panel 14 through a pair of upper and lower hinge members 76 by means of nut runner of fastener 78.

The door supply robot 75 is a well known type of multiple joint robot which includes a hand 75a having a frame 81 for receiving a pair of toggle clamp devices 80. Clamp lever 80a of the clamp 80 is inserted through the window opening to hold the door sash.

Figure 29:
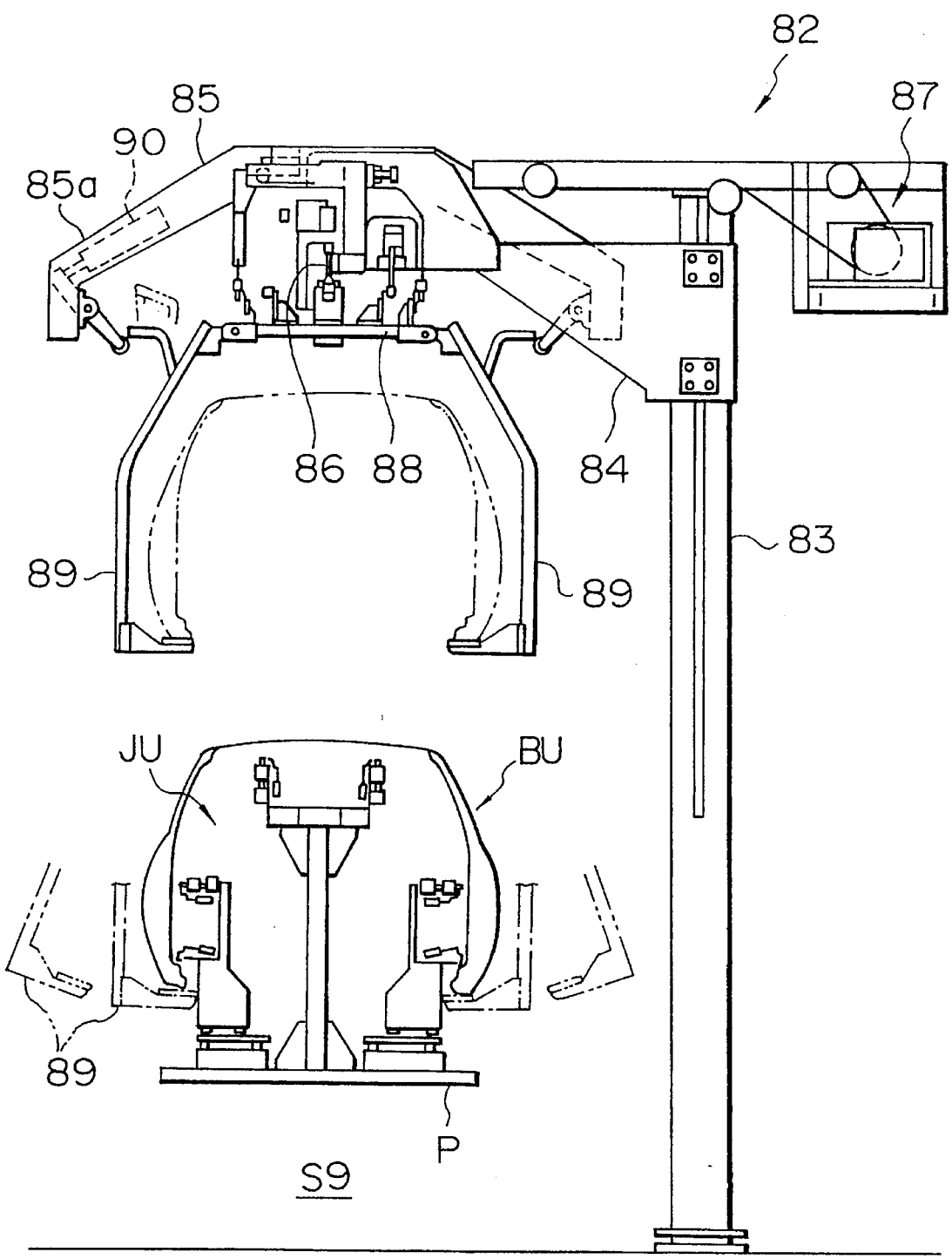
FIG. 29 is a front view of a lift.

In the Ninth station, as shown in FIGS. 20 and 29, the upper body structure is lifted by the lift 82 and the fixture JU is moved downwardly relative to the upper body structure BU and removed. Then, the fixture JU is transferred to store station ST and the upper body structure is transferred to a transfer station of the application line.

As for the lift 82, as shown in FIG. 29, vertical columns 83 stand with a certain distance in the conveying direction. Lift arm 84 is supported by the columns 83. Support frame 85 is provided at tip end of the lift arm 84. A guide rail 86 is provided between the front and rear support frames 85. The guide rail is driven by actuator 87.

Figure 32:
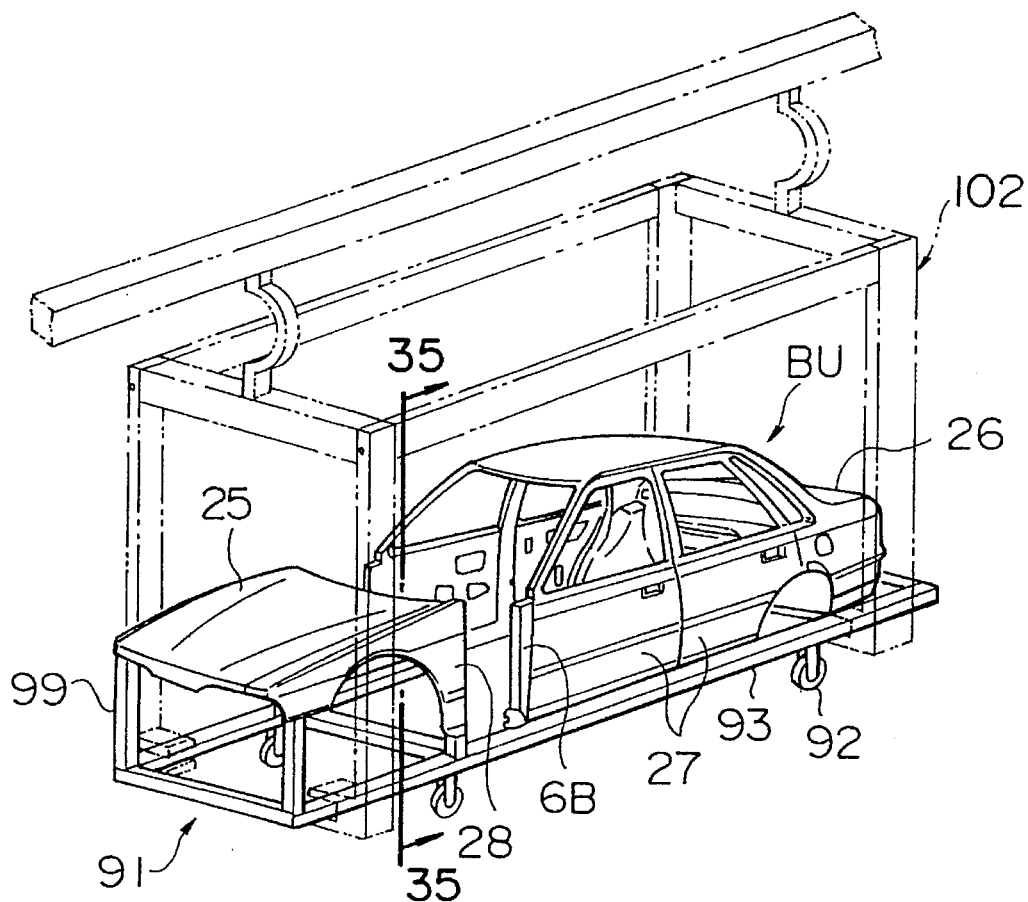
FIG. 32 is a perspective view of an under body shell, a body member and an application fixture.

A base plate 88 is movably suspended by the guide rail 86. Four support arms 89 are swingingly supported by four corner portions of the base plate 88. The arm 89 is swung by cylinder 90 which is mounted on arm portion of the arm 85 between an engaging position shown by a one point chain line in FIG. 29 and a retracted position shown by a double point chain line. The upper body shell BU is transferred from the ninth station S9 to the transfer station as the upper body shell BU is lifted. As shown in FIG. 32, at the transfer station, the upper body shell BU is lowered and positioned onto application fixture 91.

A modified assembling line BUL will be explained hereinafter.

Figure 30:
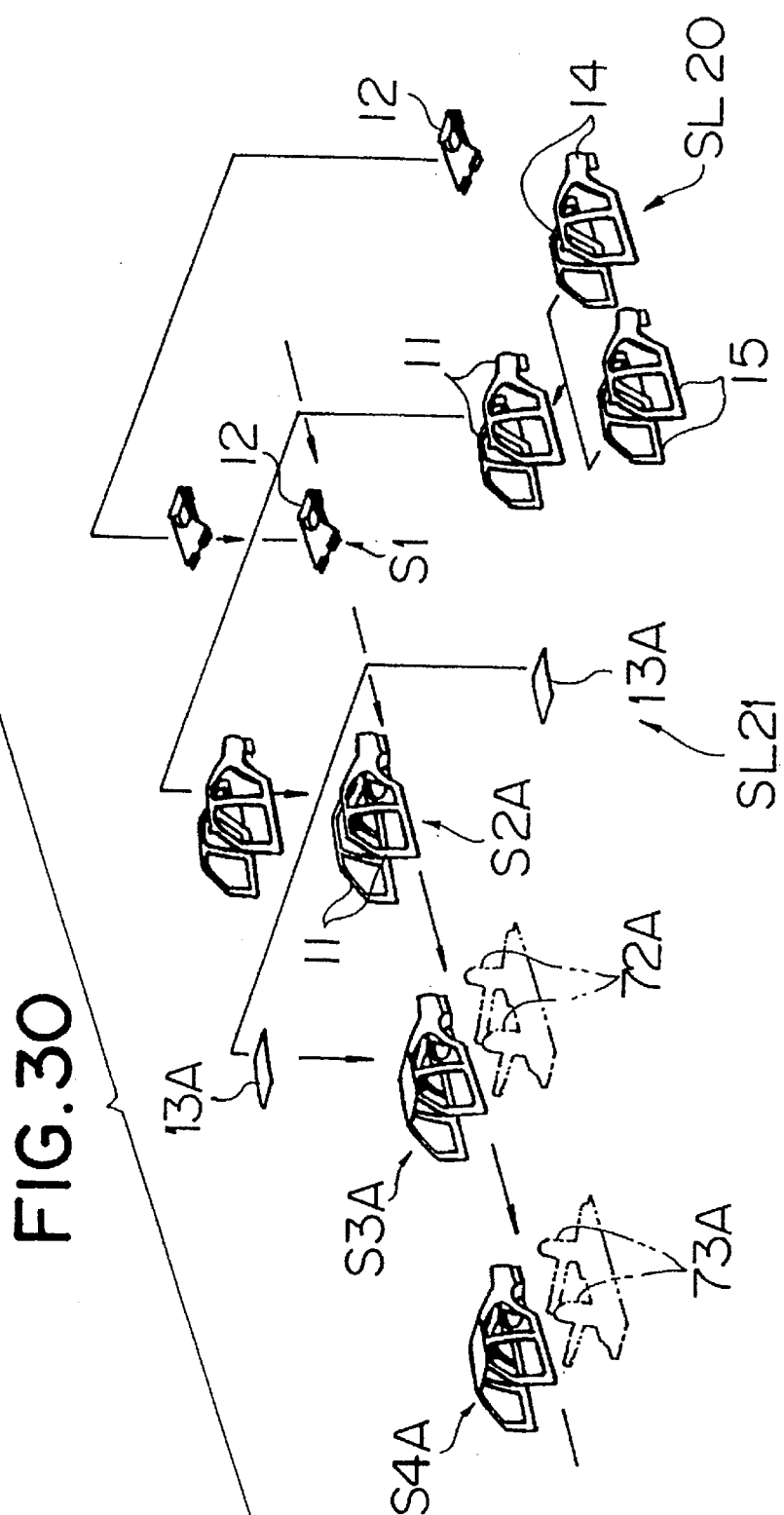
FIG. 30 is a perspective view for explaining the body assembling process.

As shown in FIG. 30, there is provided sub-line SL 20 from where right and left side panel 11 are supplied to second station S20. Then, the right and left body side panels 11 are transferred from the first station S1 to second station S2A and positioned and fixed to the fixture JU.

Next, in the second sub-line SL21, roof panel assembly 13A which is formed by sub-assembling the front and rear headers 22 and 23 with roof panel 13 is supplied, positioned and fixed to the fixture JU. Then the body member is joined by the tack welds. The body member is transferred to the eighth station S8 after making additional welding on the body member.

The application process will be explained in reference with FIGS. 31-36. In the application process, the upper body shell BU, front fender 28 and bonnet 25 are mounted on application fixture 91. On the upper body shell are temporarily mounted a side door and a trunk lid 26. Under body portion BD and front body portion BF are also subjected to the application process.

Figure 33:
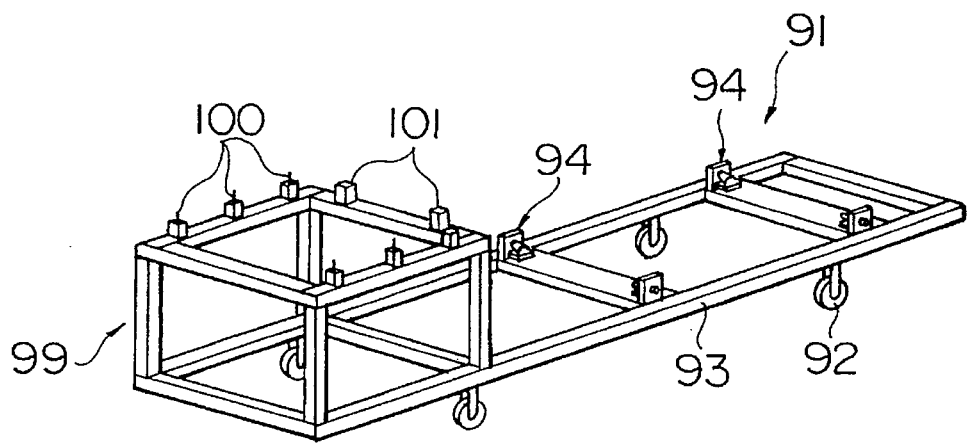
FIG. 33 is a perspective view of the fixture of FIG. 32.

As shown in FIGS. 32, 33, there are provided movable rectangular base frames 93 having four wheels. A pair of retainers 94 is provided for holding the rear frame 21 of upper body shell BU at a rear portion of the base frame 93.

Another pair of retainers 94 is provided at middle portion of the base frame 93 in the longitudinal direction thereof for holding rear frame 21 of the upper body shell BU.

Figure 34:
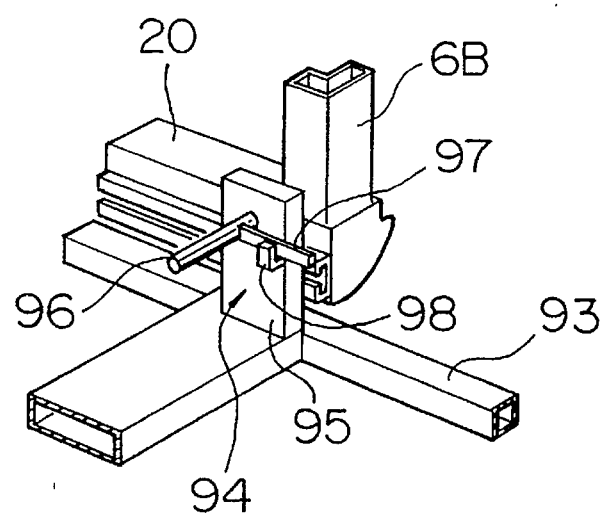
FIG. 34 is a perspective view showing a retaining mechanism.
Figure 35:
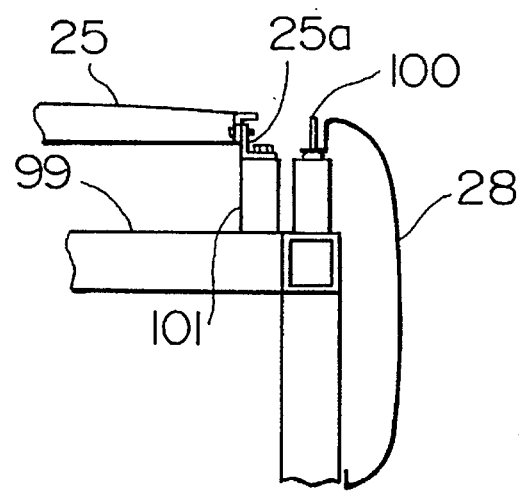
FIG. 35 is a sectional view along a line 35—35 in FIG. 32.

As shown in FIG. 34, the transverse fastening pin 96 mounted on the support bracket 95 is moved outwardly to be engaged with a positioning opening (not shown) of the rear frame or the closed cross structure 6B at the outer end. Then, the lever 97 is engaged with engaging member 98 to fix the body shell BU to the base plate 93.

In order to fix front fender 28 and bonnet 25 to the base frame 93, pins 100 of the support frame are inserted into three bolt openings of front fender 28 and bonnet hinge 25a of the bonnet 25 is fixed to a pair of blocks 101 of the frame 99 provisionally.

Figure 31:
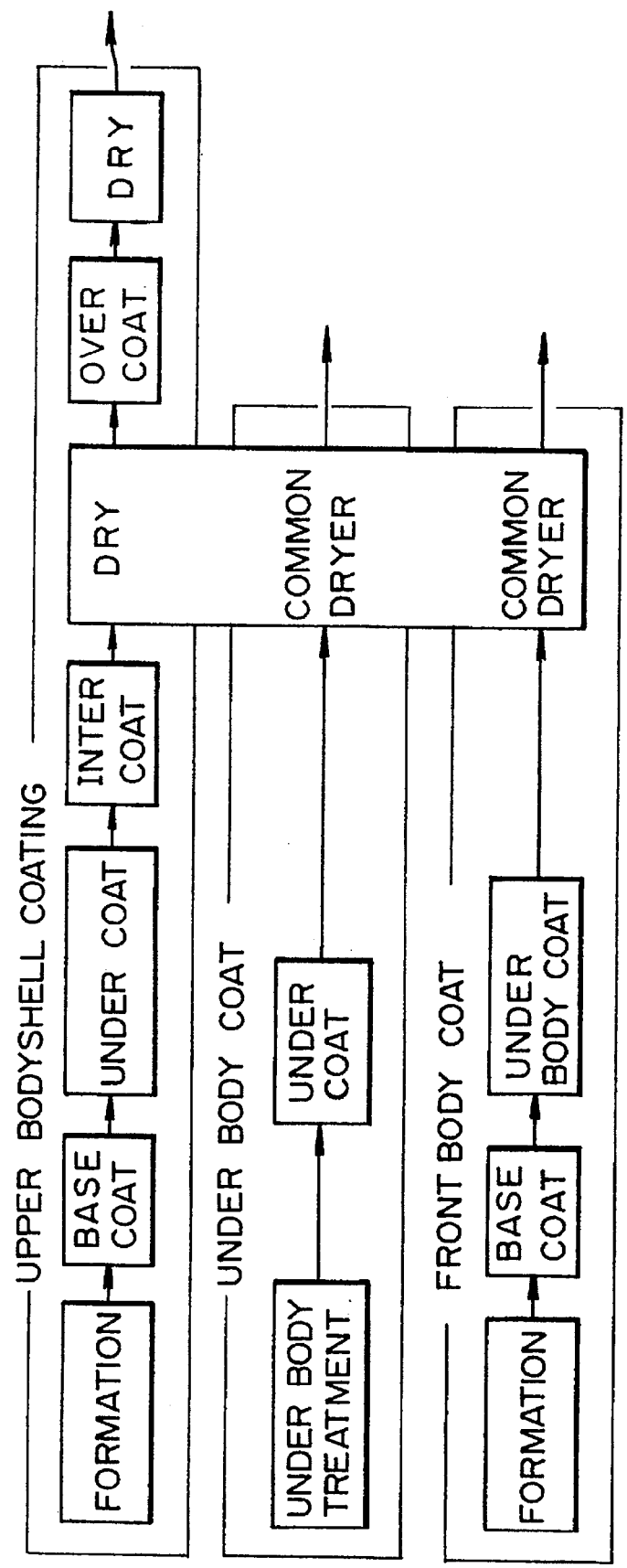
FIG. 31 is a diagram showing an application process.

Referring to FIG. 31, the application process will be explained. On application fixture 91 are mounted four side doors, an upper body shell, a bonnet and front fender 28 which are hung by 102 together with the fixture 91 and are transferred to stations of the application line.

In the formation treatment process, the upper body shell BU and the body member is subjected to degreasing treatment, forming a zinc phosphate base coating by continuous spraying and rinsing.

In the base coating process, upper body shell BU and the body member with the fixture 91 are dipped into a coating bath of epoxy resin for electro-coating wherein electro-coating is made on the body member as a cathode with 200–400 V, thereafter, being rinsed and dried at 170 degrees centigrade for 25 minutes.

In the undercoating process, an anti-chipping compound such as urethane or PVC base compound is sprayed on a lower outer surface of the upper body shell BU, side door 27 and a rear portion of front fender 28 and dried to form an under-coating of 100–200 µm.

In the inter-coating process, the upper body shell BU, and body member are grounded and subjected to electrostatic-coating by charging epoxy ester base coating compound with −60 from −90 kV. Thereafter, the solvent is vaporized for 5 to 10 minutes. In drying process, the upper body shell BU and the body member are dried at 140 to 150 degrees centigrade for 25 minutes.

In the over coating process and the upper body shell BU, body member are grounded and subjected to electrostatic-coating by charging melamine-alkyd resin or acrylic resin base paint with −60 from −90 kV. Thereafter, the solvent is vaporized for 5 to 10 minutes. In the drying process, the upper body shell BU and the body member are dried at 140 to 150 degree centigrade for 25 minutes.

Thus, in the formation treatment process to the over coating process, the side door 27, upper body shell BU, front fender 28 and bonnet 25 are mounted on the single fixture 91 and treated together so that uniform coating in color can be obtained. The line for the application can be simplified and thus is not costly as well. In addition, the number of the hangers 102 can be reduced so that deposition of the electro-coating material can be reduced and thus the consumption of the coating material can be reduced. Light lid and garnish may be attached to the fixture 91 by means of support frame 99 to be coated together with the body member and the upper body shell BU.

Prior to the application of the underbody portion BD, the underbody portion BD is subjected to application of sealing material and mounting of a hole cover and melt sheet.

In the undercoating process, an anti-chipping compound such as urethane or PVC base compound is sprayed on a lower surface of the under body shell BD and dried in a common drying chamber to the upper body shell BU to form an under-coating of 100–200 µm. When the under body portion BD is made of steel, the under body portion and upper body portion can be treated together on the fixture 91 before the inter-coating process.

Figure 36:
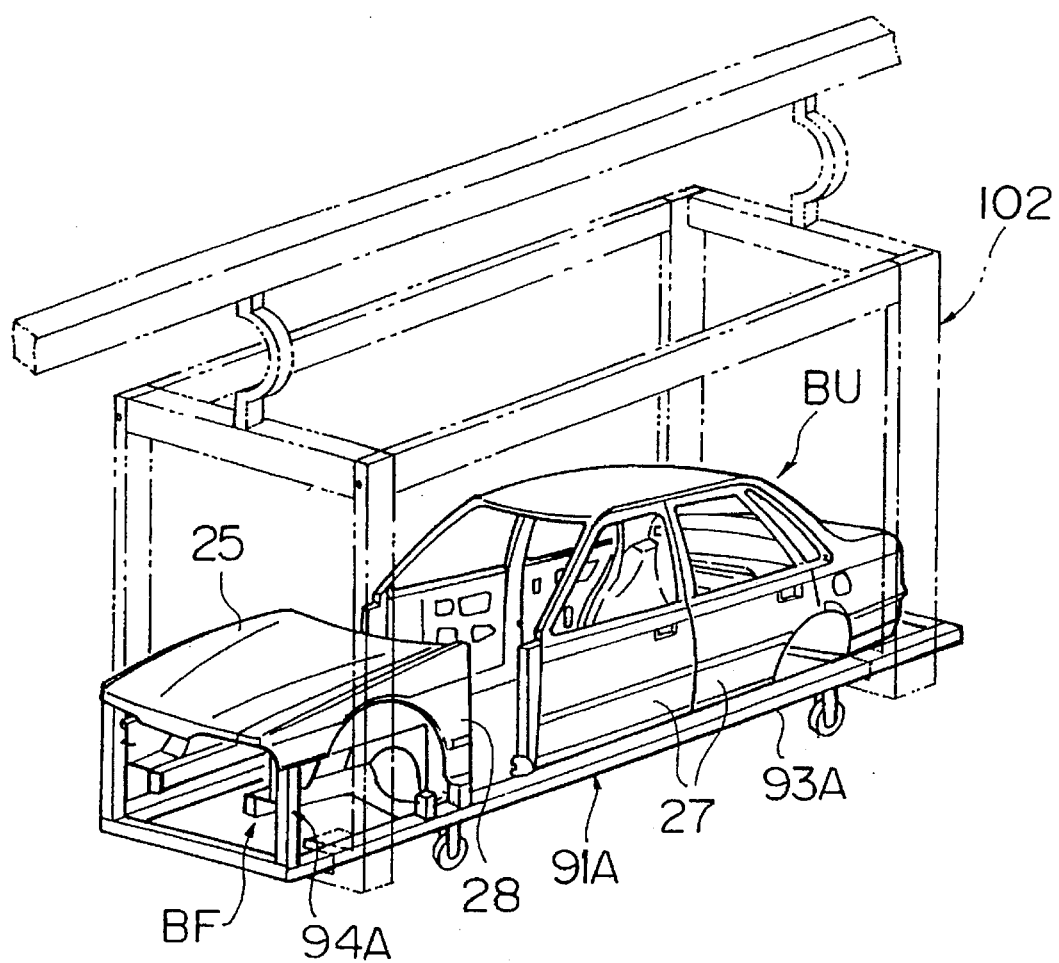
FIG. 36 is a perspective view similar to FIG. 33 but showing another structure.

Front body portion BF is treated similar to the upper body shell in the formation treatment, base coating, under coating and drying in the same drying chamber as the upper body shell BU. Thus, efficiency of the drying process can be improved. Running and installation cost can be reduced. As shown in FIG. 36, retainer 94A at the front portion of base frame 93A is provided on the fixture 91 instead of the support frame 99 for holding the front body portion BF which is to be treated together with the side door 27 and upper body shell BU.

After the application process, the upper body shell BU, front fender 28 and bonnet 25 are removed from the fixture 91. Right and left side doors 27 and trunk lid 26 are removed from the upper body shell BU. The body member and both body members BD are transferred to separate equipping lines therefor in the body assembling process.

Vehicle Assembling Process

There will be described a vehicle assembling process referring to FIGS. 37 to 46.

Figure 37:
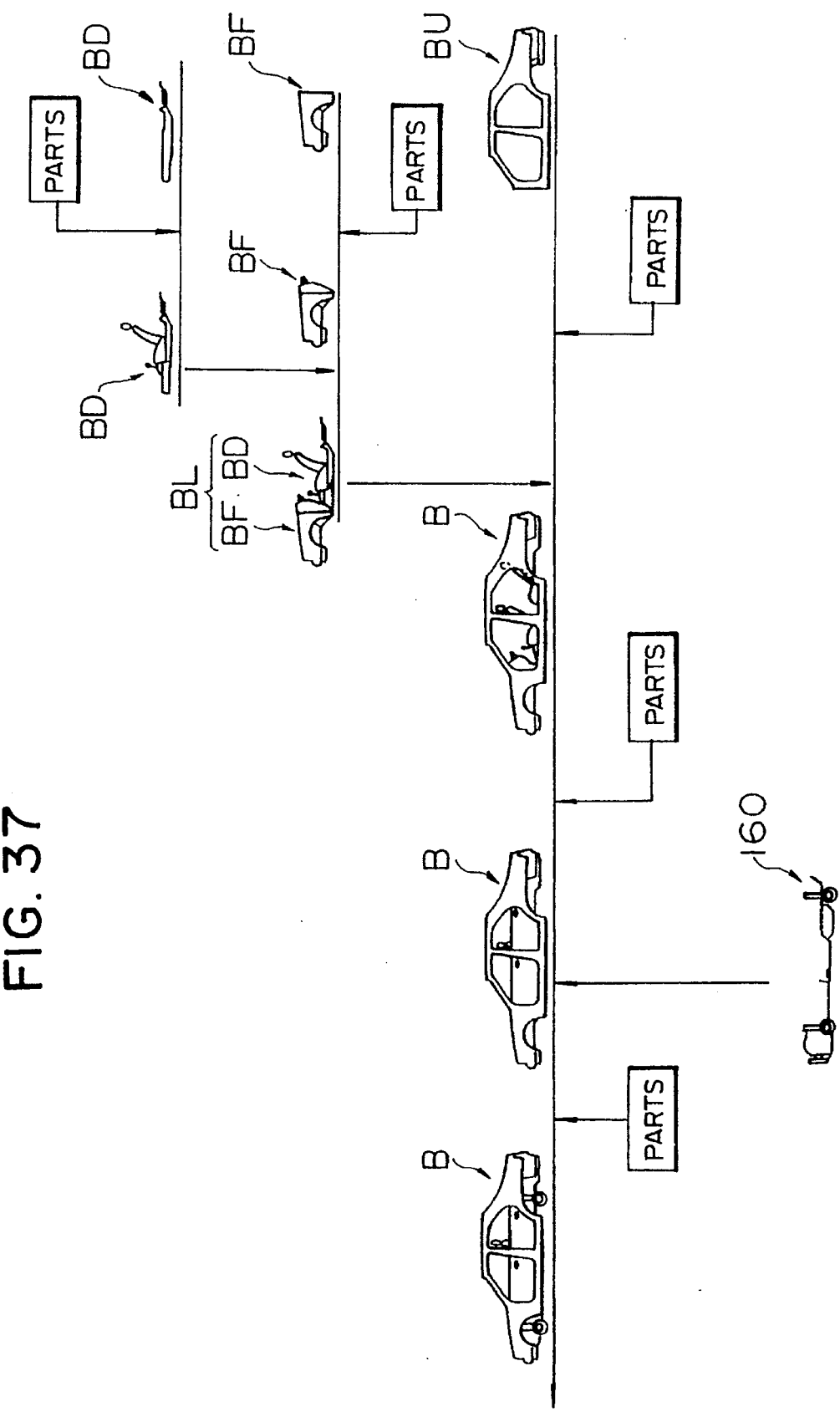
FIG. 37 is a perspective view showing a vehicle assembling line.

Main equipping line includes one for the upper body shell BU. As shown in FIG. 37, body portions BD and BF and body members such as lid members are supplied to the main line in order to be mounted on the upper body shell BU to assemble the upper body shell BU.

Figure 38:
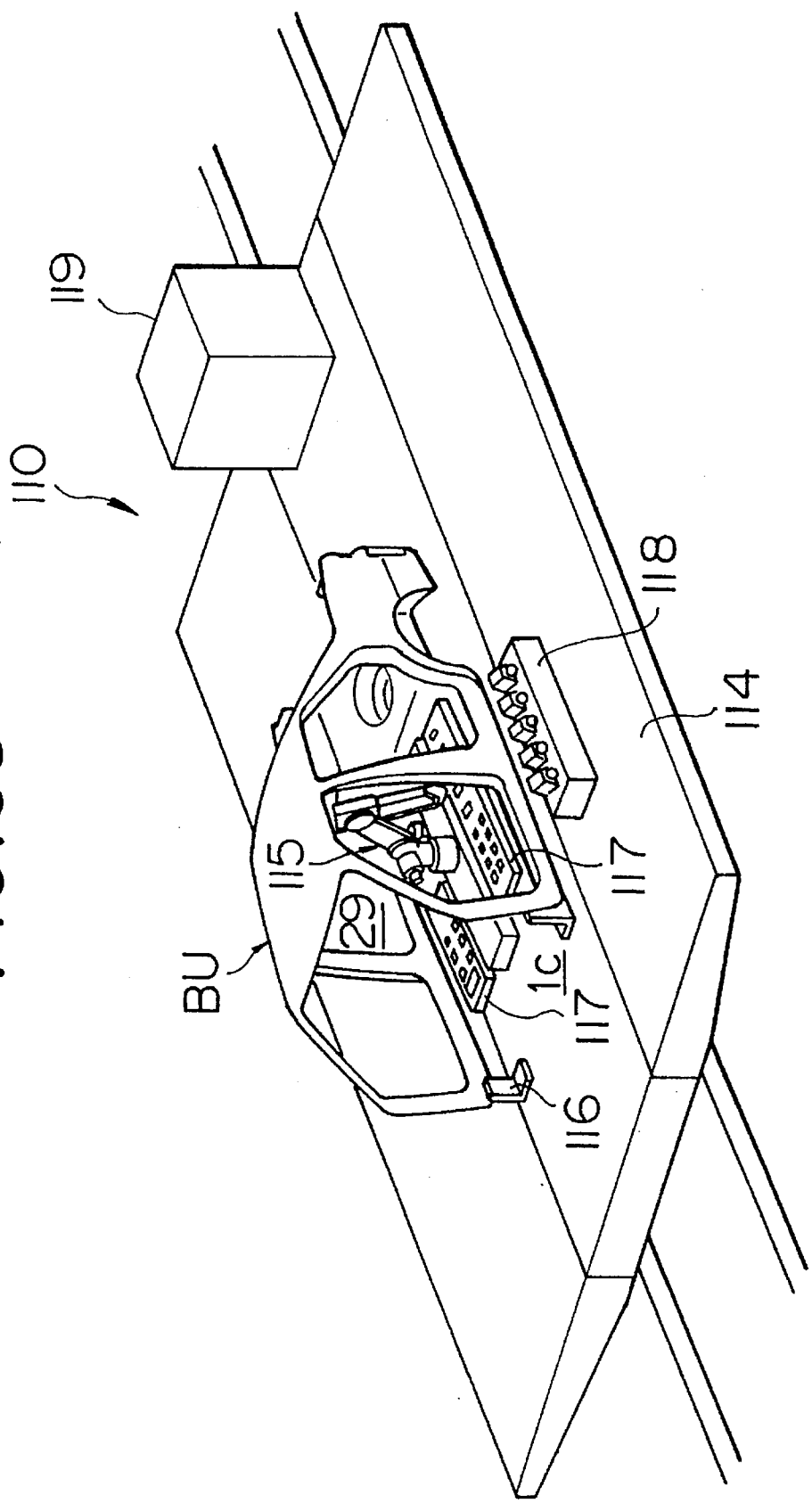
FIG. 38 is a perspective view of a conveying truck.
Figure 39:
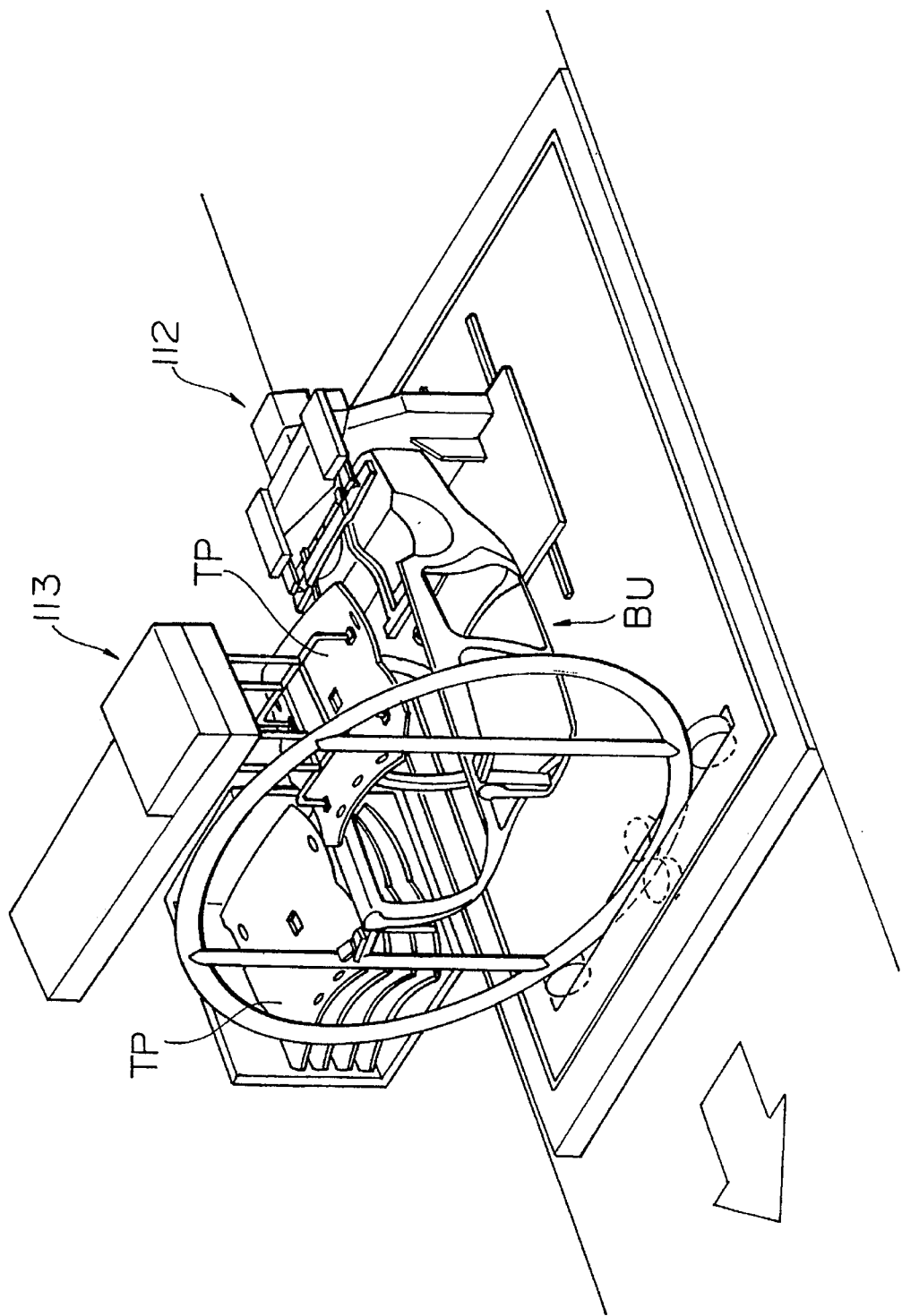
FIG. 39 is a view similar to FIG. 38 but showing another structure.

As shown in FIG. 38, as the upper body shell BU is transferred in the equipping line, a screw grommet, fastener, harness, an interior unit including top sealing, a sun visor, a room mirror and the like, a rear strut, a rear combination lamp, a package unit including package trim, a speaker, a high mount lamp and the like, a rear bumper, a rear floor mat, a rear seat, a trunk room unit, a rear windshield and the like are equipped on the upper body shell BU by means of equipping robot 115 disposed on truck 110.

Transfer truck 114 with its own driving mechanism is provided with a plurality of support brackets 116 for positioning and holding the upper body shell BU and robot 115 on the center portion and sub-pallets 117 at the opposite sides of the robot 115. On the sub-pallet 117 is provided a plurality of fit-in parts of a predetermined arrangement. On the left side of the robot and outside of the upper body shell BU is disposed tool base 118 on which a plurality of tools to be removably mounted on the robot 115 is arranged with the tools in a predetermined order.

The robot 115 is of a multiple joint type which is commonly known.

Control box 119 is provided for controlling the robot 115. As the truck 114 is moved, the control box 119 produces signals for equipping. Thus, the parts are equipped for the upper body shell BU which is separated from the under body portion. In this process, as understood, the robot can be disposed through floor opening 1c. Therefore, the fit-in parts can be equipped for the inside of the upper body shell. effectively by disposing the robot 115 in passenger compartment 29. The equipping process can be automated without great difficulty. The equipping process is applied while the upper body shell is conveyed so that time loss can be reduced. The truck 114 can be moved intermittently as well.

Alternatively, conveying truck 112 can be provided with a rotatable support mechanism for rotatably supporting the upper body shell BU. In this case, top sealing TP and the like are assembled on the upper body shell which is rotated by a certain angle by means of the automatic device 113 disposed beside the line.

As aforementioned, the upper body shell BU is assembled based on the inner panel so that assembling accuracy can be improved. The robot 115 is mounted on the truck 114 so that the upper body shell can be accurately positioned against the robot. Thus, the equipping process can be effectively automated. If the robot 115 and/or the truck 114 malfunction, the malfunctioning devices can be removed from the line without stopping the line and without reducing operating efficiency. Teaching and testing for the robot 115 can be made out of the line. This is convenient when a model change of the vehicle is made.

Figure 40:
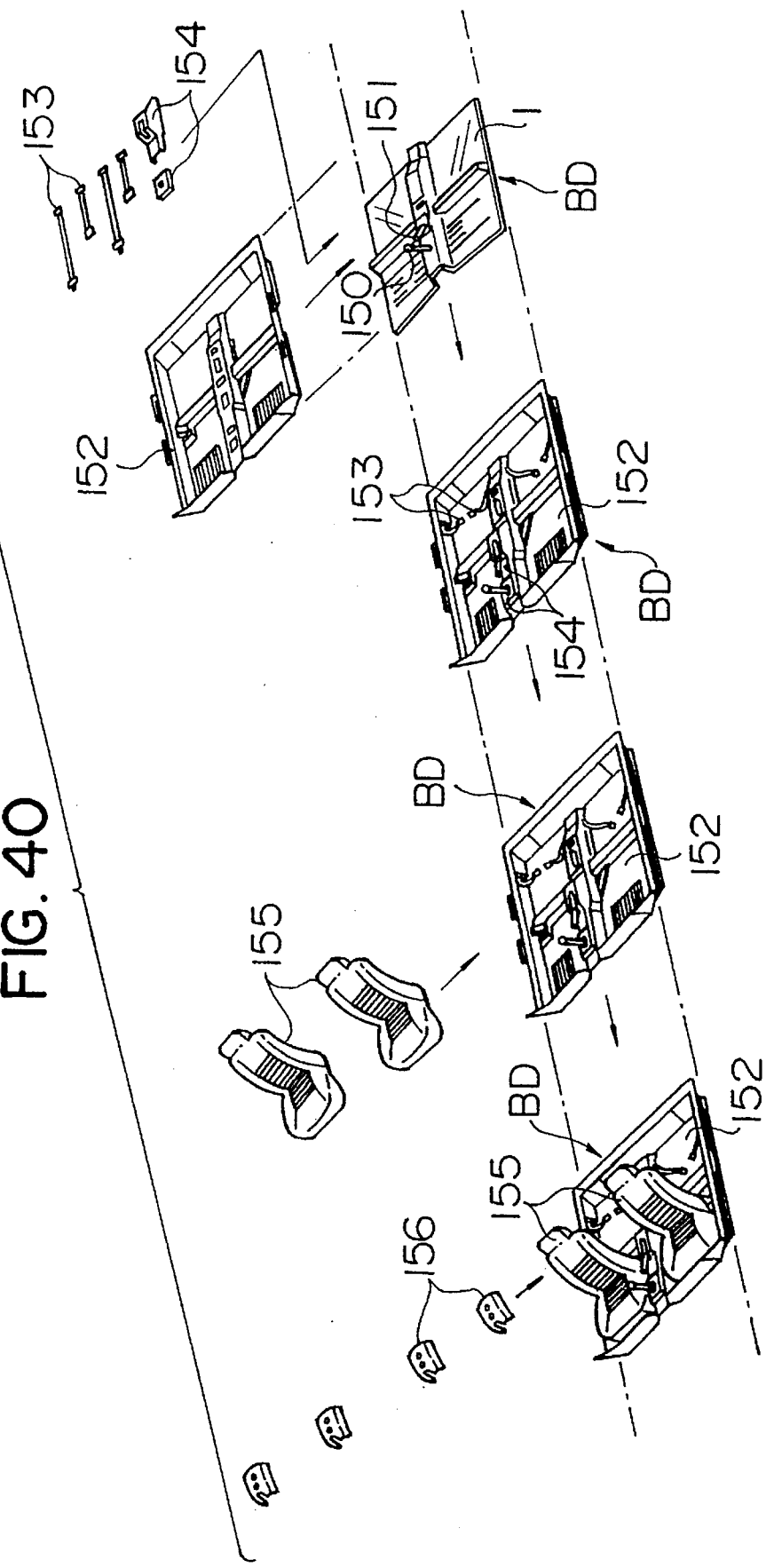
FIG. 40 is a perspective view showing an equipping line
Figure 41:
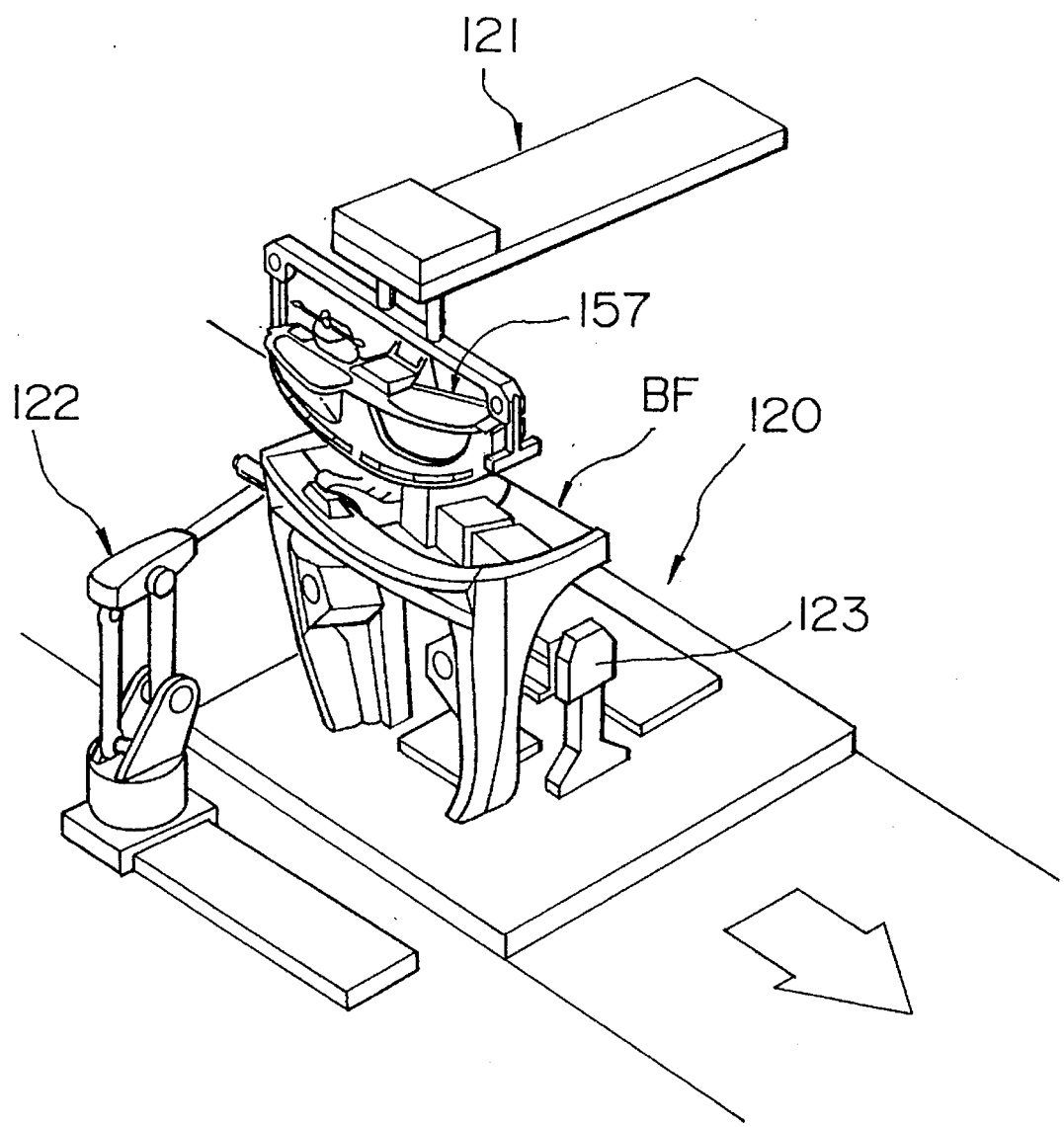
FIG. 41 is a perspective view of an essential portion of the equipping line.

In the equipping line for the underbody portion BD, as shown in FIG. 40, the underbody portion BD is positioned and fixed to pallet (not shown) and transferred to a plurality of stations in order. Change lever 150, parking brake lever 151, floor mat 152, rear seat belt 153 and rear console 154 as fit-in parts are mounted on the underbody portion BD. Then, small things such as a fastener and bolts are is mounted on the underbody portion BD by robot (not shown).

Next, four seal protectors 156 are provided for covering a passenger's feet on front seat 155. Thus, the equipping process is applied on the underbody portion BD on the separate equipping line so that working efficiency can be improved.

Figure 42:
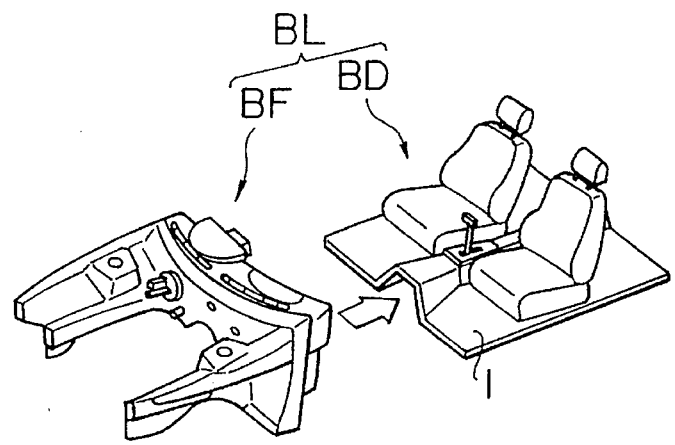
FIG. 42 is a perspective view of an under body portion and a front body portion in a joining process.

In the equipping line for the front body portion BF, as shown in FIG. 42, the front body portion BF, positioned and fixed on the truck 120, is conveyed on the equipping line. An acceleration pedal, a brake pedal, a wiper motor, dash unit 157 including an inner panel assembly and an air conditioner unit are mounted on the front body portion BF.

The truck 120 is provided with support mechanism 123 which changes the attitude of the front body portion BF between the vertical position and the horizontal position. The equipping process is applied on the front body portion BF while changing the attitude of the front body by means of automatic device 122 disposed beside of the line. The dash unit 157 and the like are supplied, positioned on the front body portion BF which is made up side down by supply device 121 and mounted thereon by the automatic device 122. Since the attitude of the front body portion BF is switched while being equipped with fit-in parts, the equipping efficiency can be improved. In addition, it is not necessary to use devices for holding the parts against the body portion BF prior to the equipping.

In equipping lines for lid like members such as the side door 27, front fender 28, bonnet 25 and trunk lid 26, black painting, application of the secondary corrosion protection oil and mounting of molding and rubber are made. Then, fit-in parts such as harness and lamp, wind regulator are mounted thereon. Thus, these lid like members, which are separated from the upper body shell BU, are equipped in the respective equipping lines. The equipping efficiency can be improved.

As shown in FIG. 42, front body portion BF is moved toward the underbody portion BD rearward and mounted onto underbody portion BD from the front of the underbody portion BD to form integrated lower body shell BL. In this case, the two body portion BD, BF are joined by bolts and nuts, adhesive, welding, a combination thereof and the like.

Next, lower body shell BL is positioned and mounted on movable truck 125 in joint station CS1. Upper body shell BU is hung by hanger 127 and fixed to right and left stationary bases 126 of the joint station CS1. The movable truck 125 is moved rearward under the upper body shell BU and mounted thereon. In this case, opposite side ends of the front floor are moved rearward and engaged with bearing portions 31b of engaging grooves 33 of the side sills 20. The front floor 1 is fixed to the side sill 20 by adhesive applied on the grooves 33. Concurrently, cross sectioned structures 6A and 6B forming the hinge pillar 6 of are engaged and joined together by joint robot 128 between the stationary bases 126. Other portions such as the rear end of the front floor 1 are also joined by the robot 128. Thus, the lower body shell BL is assembled with the upper body shell BU to form a body shell. When the upper body shell includes cowl member 10A, seatback of the front seat 155 falls down rearward to take a reclined position to avoid interference of the cowl member 10A and the upper end portion of the seatback.

Figure 47:
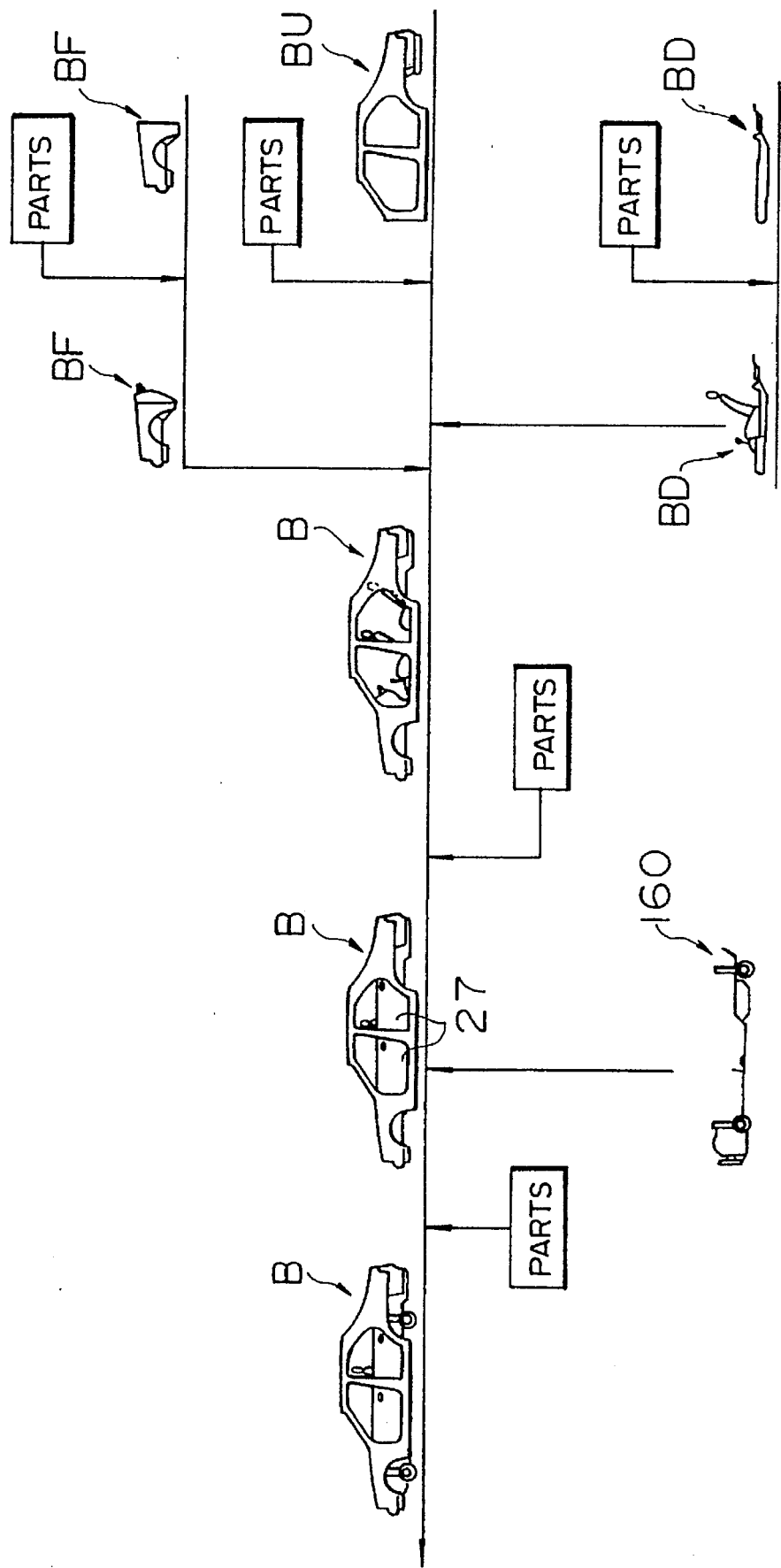
FIG. 47 is a view showing a vehicle assembling process of another embodiment.
Figure 48:
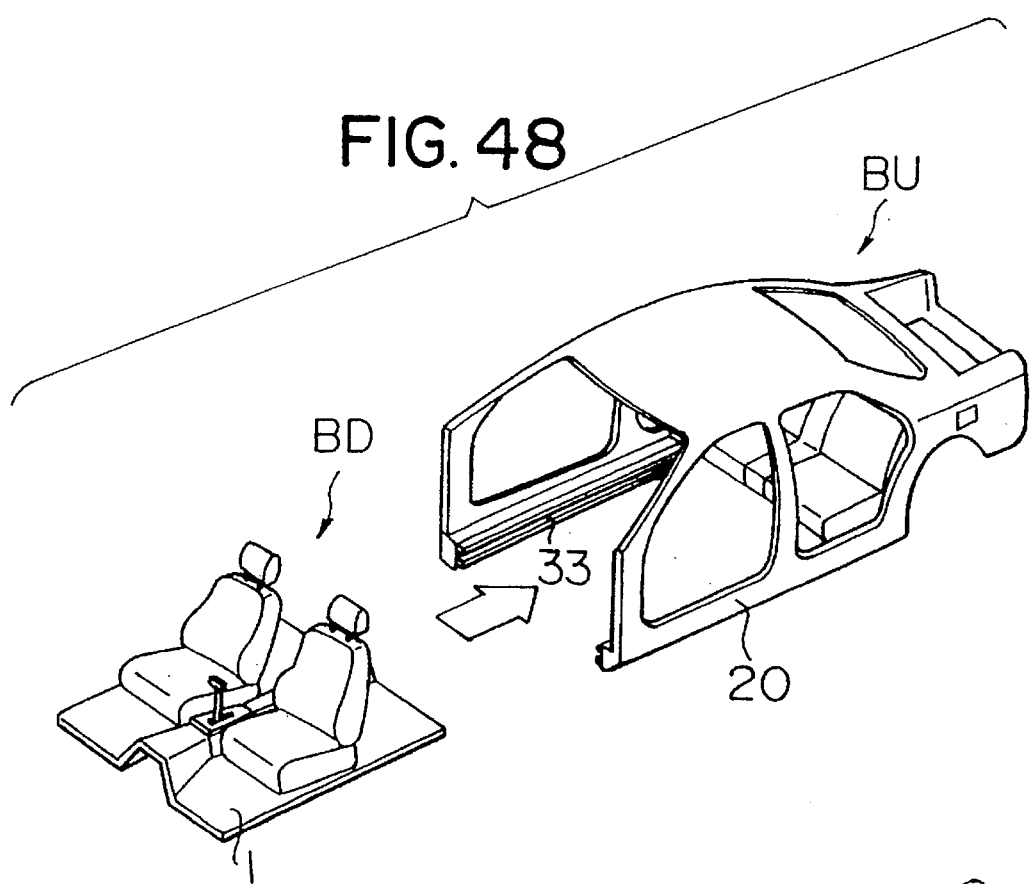
FIG. 48 is a perspective view of a joining process of an upper body shell and an under body shell.
Figure 49:
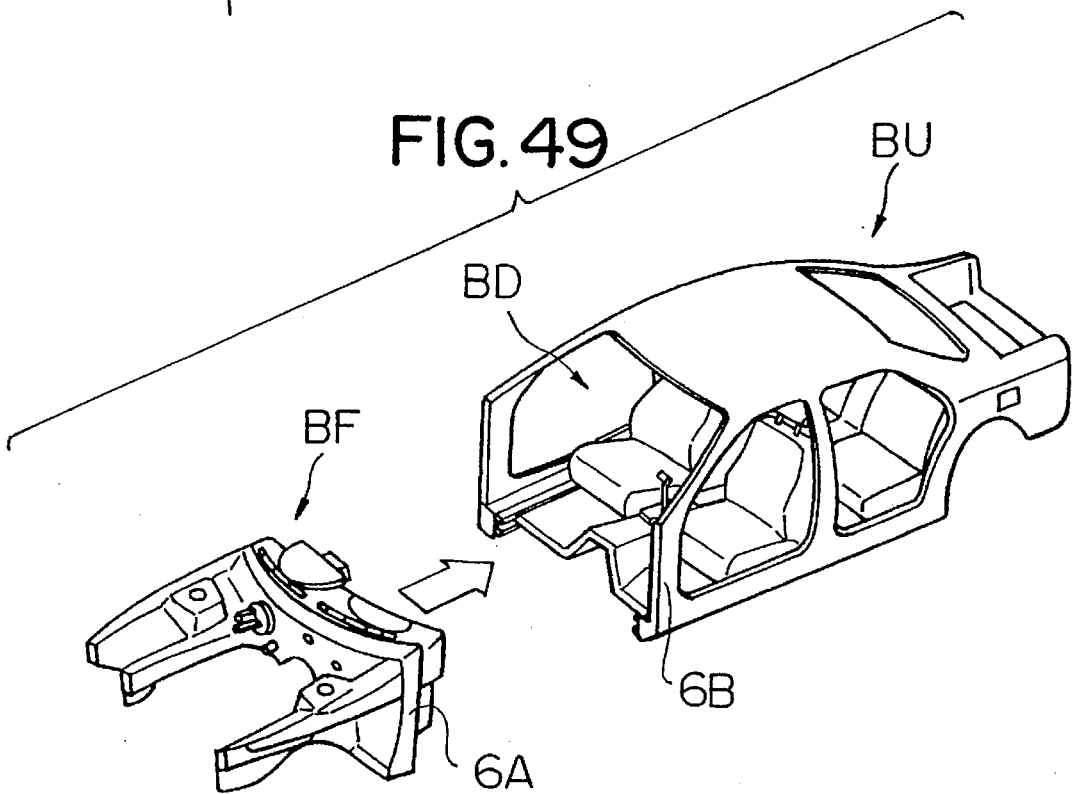
FIG. 49 is a perspective view of an upper body shell and a lower body shell in the joining process in accordance with another embodiment.

In a modification of the joining process, as shown in FIGS. 47 to 49, the underbody portion BD is moved rearward and mounted to the upper body shell BU at first. Then, the front body portion BF is moved rearward and mounted to the integrated structure of the upper body shell BU and the underbody portion BD.

Next, the body shell B, hung by conveying hanger (not shown), is transferred to a plurality of stations in order wherein lid like members such as side door 27, trunk lid 26 and a front windshield glass are positioned and mounted on the body shell B. The process is carried out before lower body unit 160, which is heavy, is mounted thereto so that the hanger can be simplified. The lid like members can be mounted easily. In the above process, the front windshield glass is mounted after the joint of the upper body shell and lower body shell so that lower end portion of glass does not interfere with the upper end of the front seat 155. The side door 27 is mounted on the body shell by means of devices similar to the door supply robot 75, a joint device 78 which is employed in the body assembling process.

Figure 46:
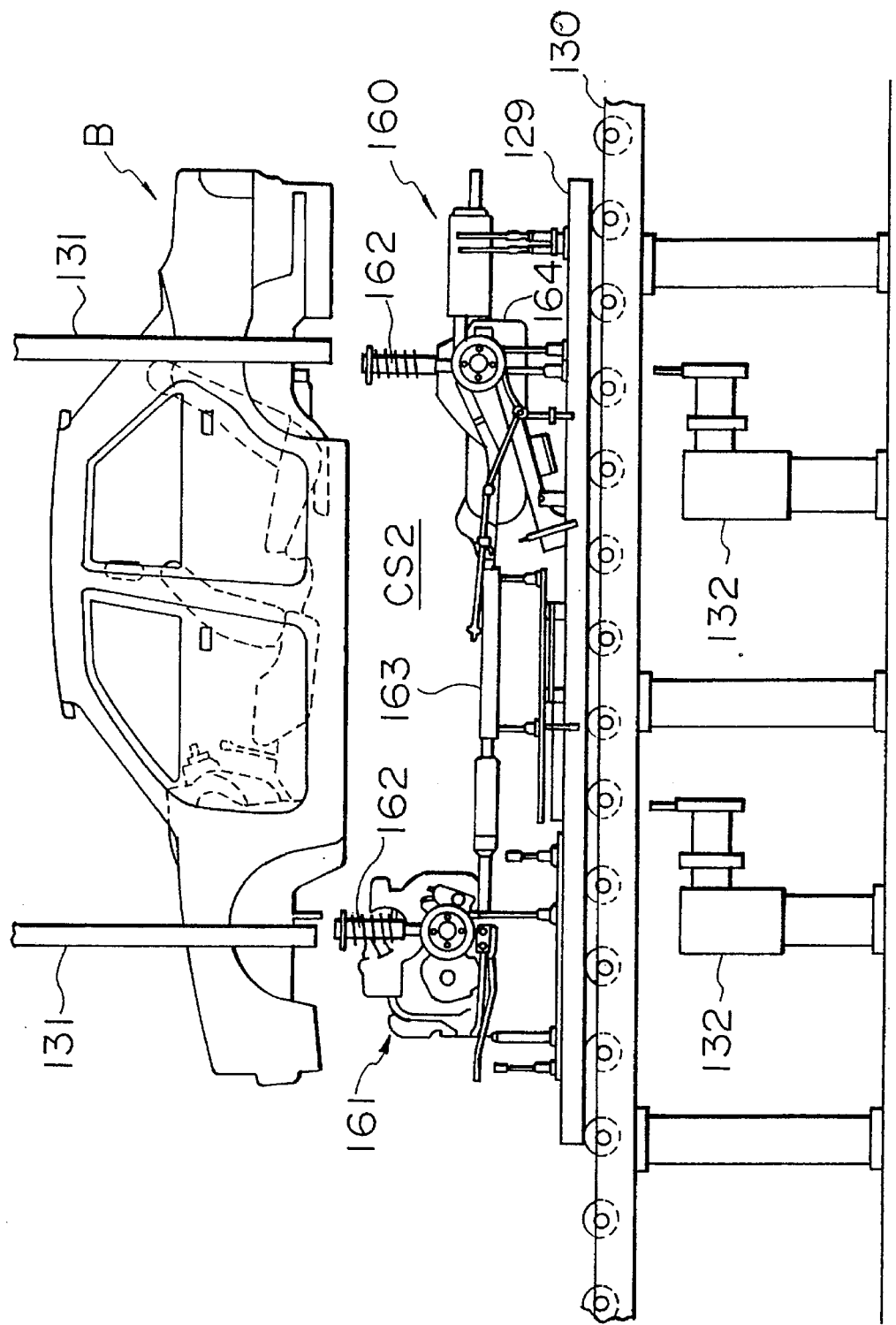
FIG. 46 is side view of a joining station for mounting lower unit.

In mounting the lower unit 160, as shown in FIG. 46, the lower unit 160 including engine 161, transmission (not shown), front and rear suspension 162 and exhaust manifold 163, and a fuel tank, which is positioned and mounted on pallet 129, is transferred to conveyor 130 of joint station CS2. The body shell B is hung by support arm 131 and transferred to the joint station CS2. Then, the body shell B is lowered to be engaged with the lower unit 160 and joined with the lower unit 160 by means of bolts and the like.

Next, right and left fenders 28 and bonnet 25 are positioned and mounted on the body shell B. Since the lower unit 160 is mounted on the body shell B before the bonnet 25 is mounted, the lower unit 160 does not interfere with the bonnet 25. Operating efficiency can be improved in mounting the lower unit 160.

In the vehicle assembling process, equipment of the upper body shell BU takes about 39 minutes, about 9 minutes for underbody portion BD and about 25 minutes for front body portion BF. Equipment for the upper body shell, which takes the longest time, is provided as a main line. As a result, the body portions BD and BF can be supplied smoothly.

Another preferred embodiment will be explained hereinafter.

Figure 50:
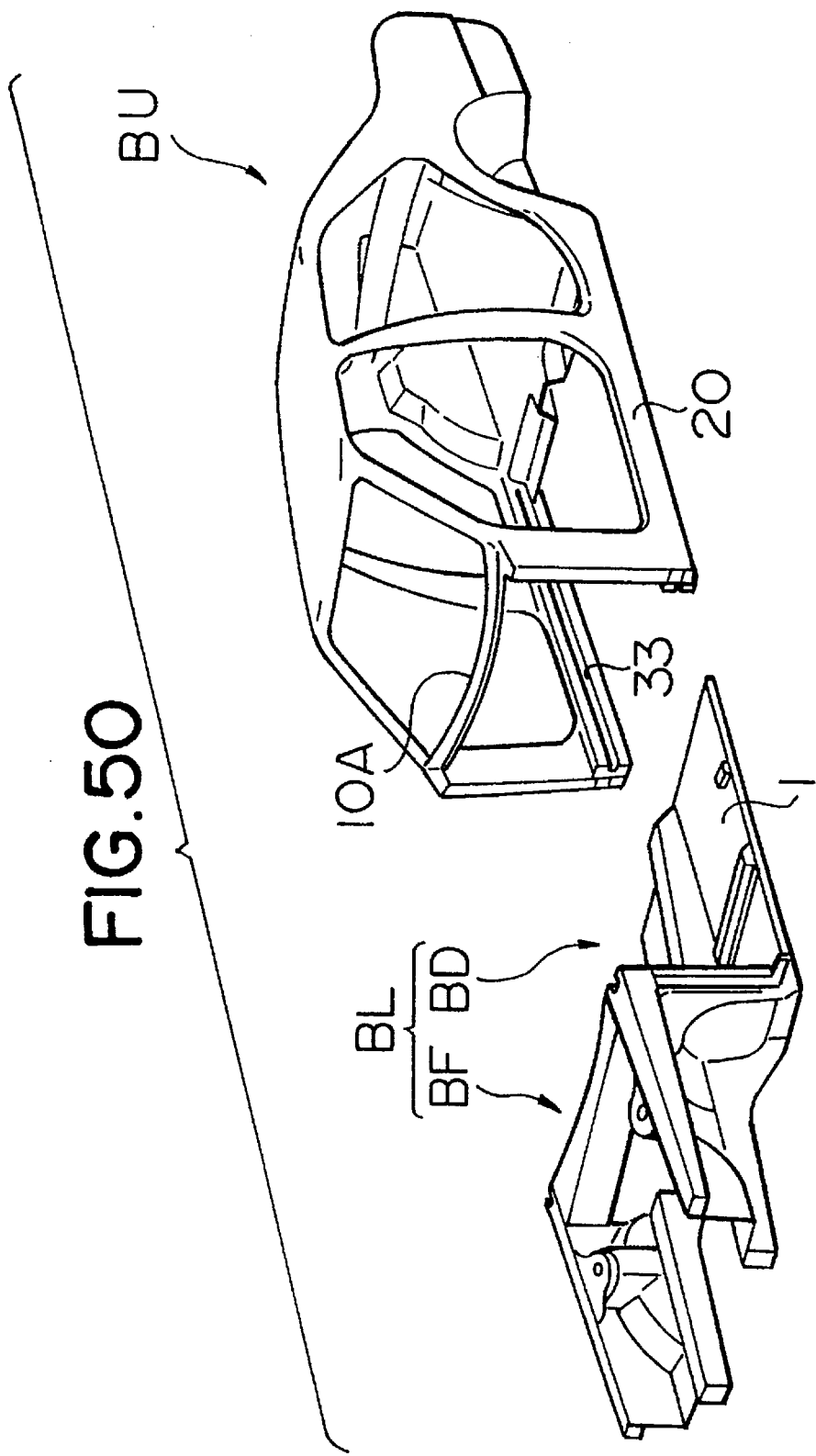
FIG. 50 is a view similar to FIG. 2 but showing another embodiment.
Figure 51:
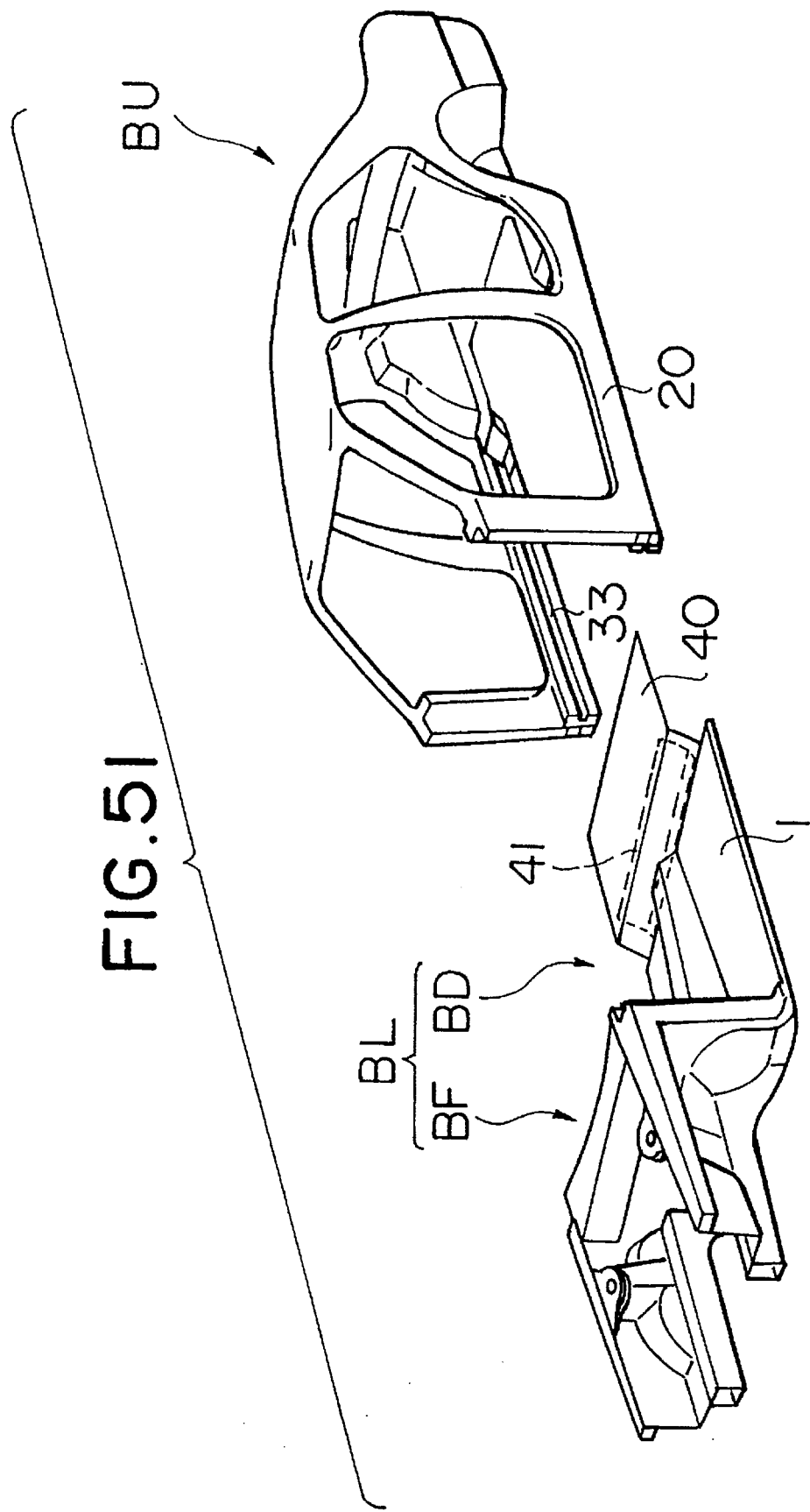
FIG. 51 is a view similar to FIG. 2 but showing another embodiment.

Referring to FIG. 50, in the vehicle assembling process, lower body shell BL and upper body shell are assembled in respective assembling lines. Cowl member 10A can be attached to the upper body shell BU as shown in FIG. 50. As shown in FIG. 51, the main center floor 40 and third cross member 41 can be included in the lower body shell BL.

In the application process, the upper body shell BL is treated as in the former embodiment. The lower body shell BL is subjected to application treatment after necessary treatment in a separate application line. Thereafter, the lower body is dried in the same drying chamber as that for the upper body shell BU after inter and over coating.

Figure 43:
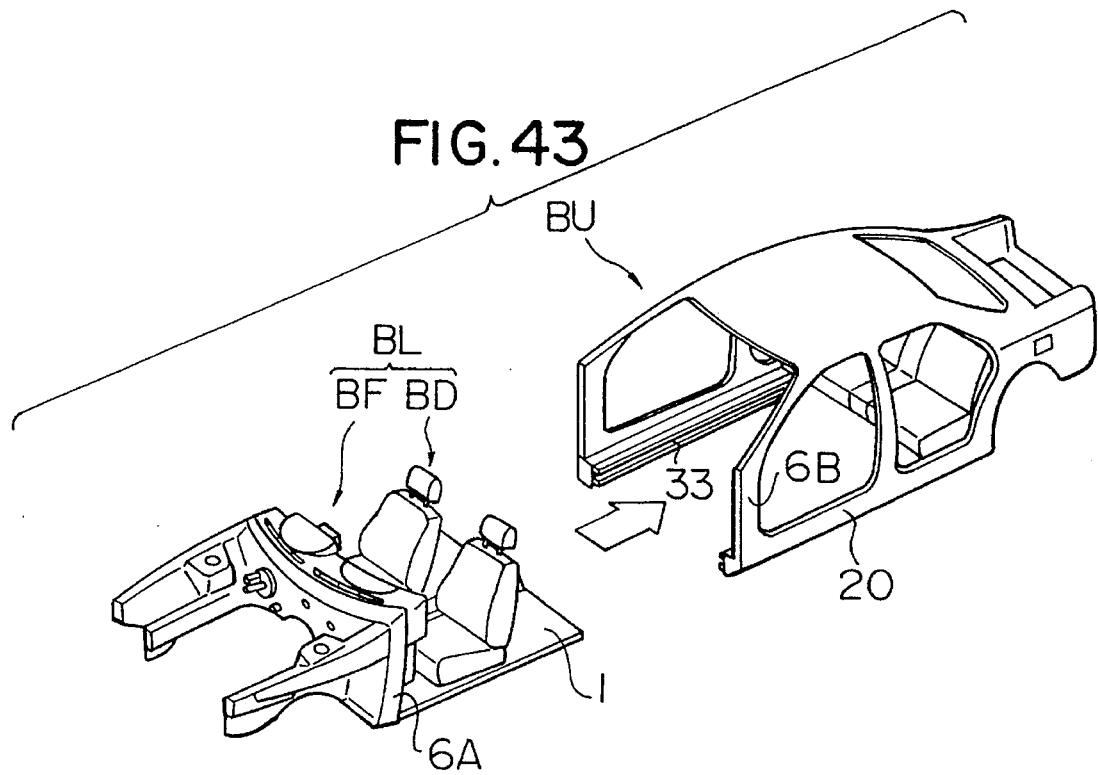
FIG. 43 is a perspective view of an upper body shell and a lower body shell in a joining process.
Figure 44:
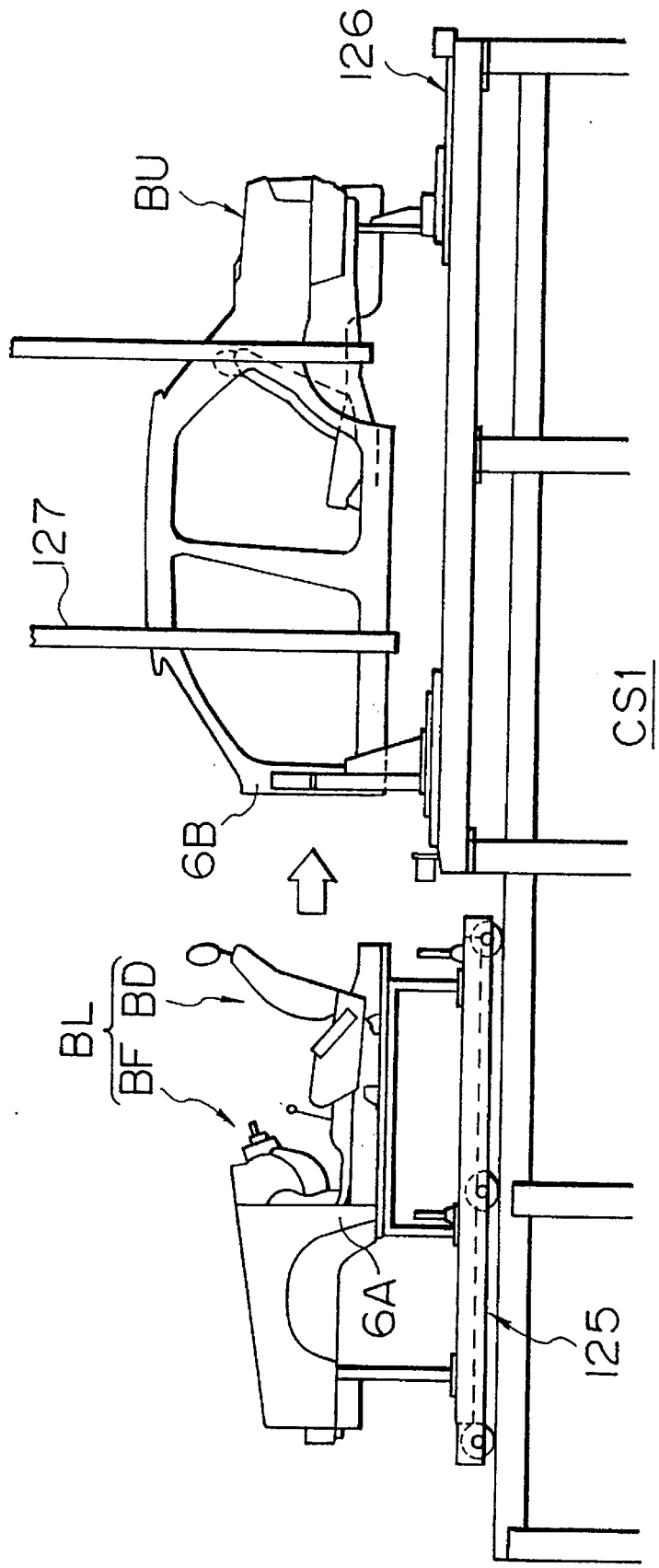
FIG. 44 is side view of a joining station for joining upper and lower body shells.
Figure 45:
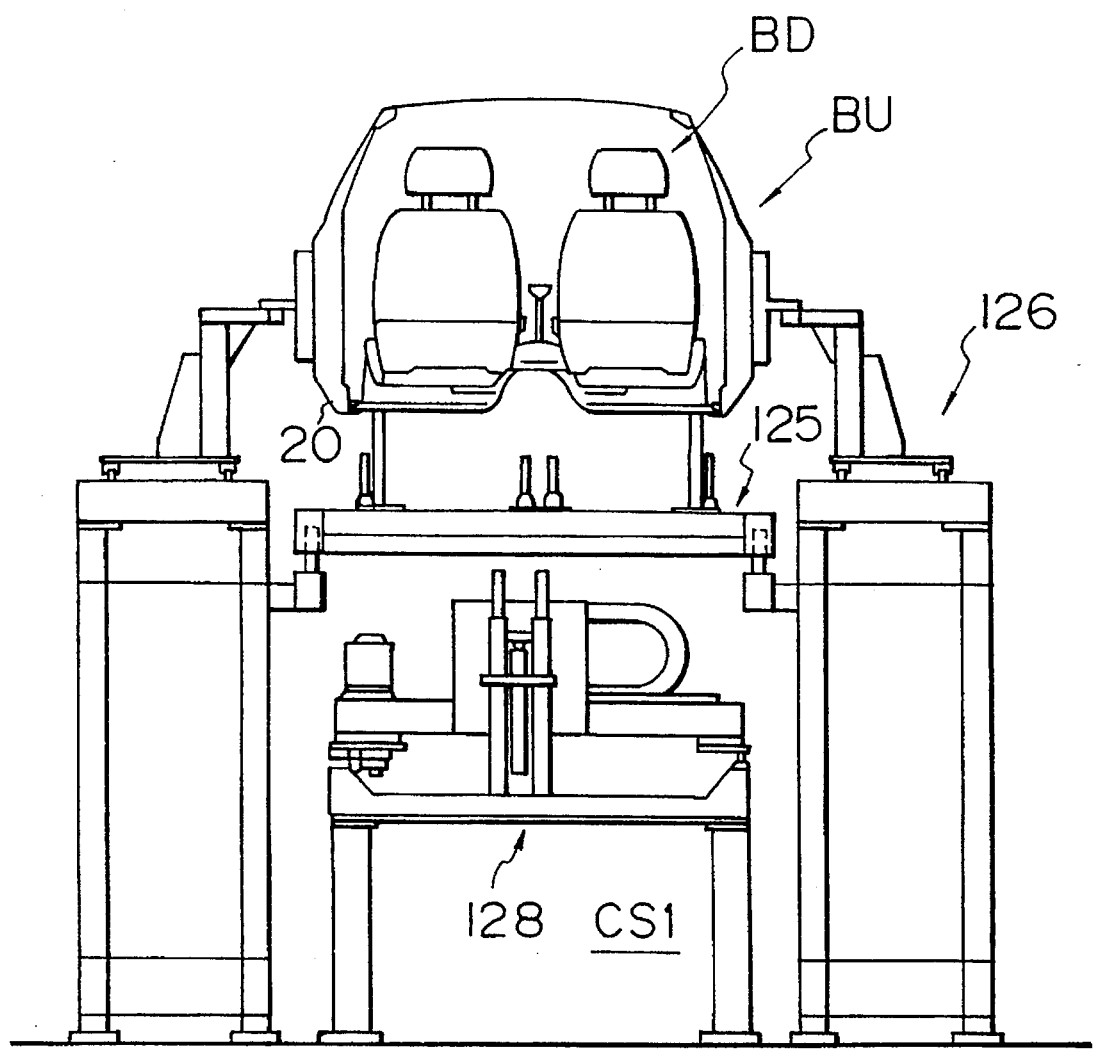
FIG. 45 is a front view of a joining station.
Figure 52:
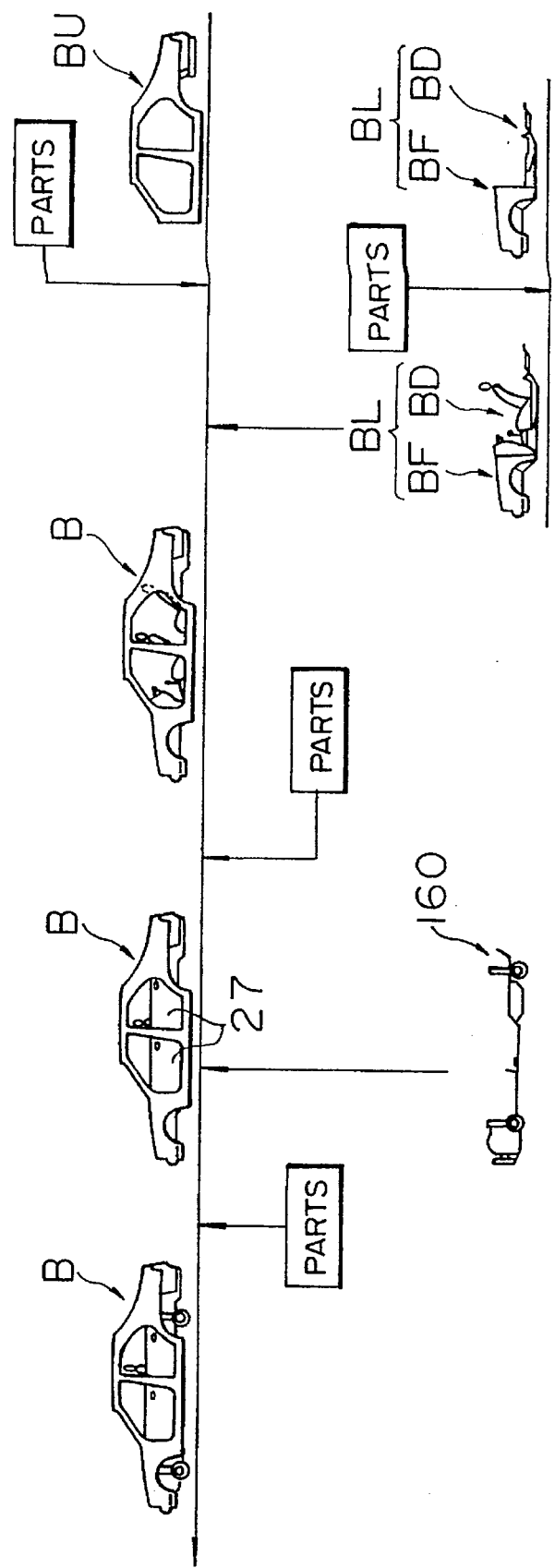
FIG. 52 is a view of a vehicle assembling process in accordance with another embodiment.

In the vehicle assembling process, as shown in FIG. 52, fit-in parts are mounted on the upper body shell BU as in the former embodiment. Fit-in parts are also mounted on the lower body shell BL as well as under body portion BD and front body portion BF as in the former embodiment. As shown in FIGS. 43 to 45, the lower body shell BL is moved rearward and mounted on the upper body shell BU and joined together.

Another embodiment of joint structure of the upper body shell BU and underbody portion BD will now be described.

Figure 53:
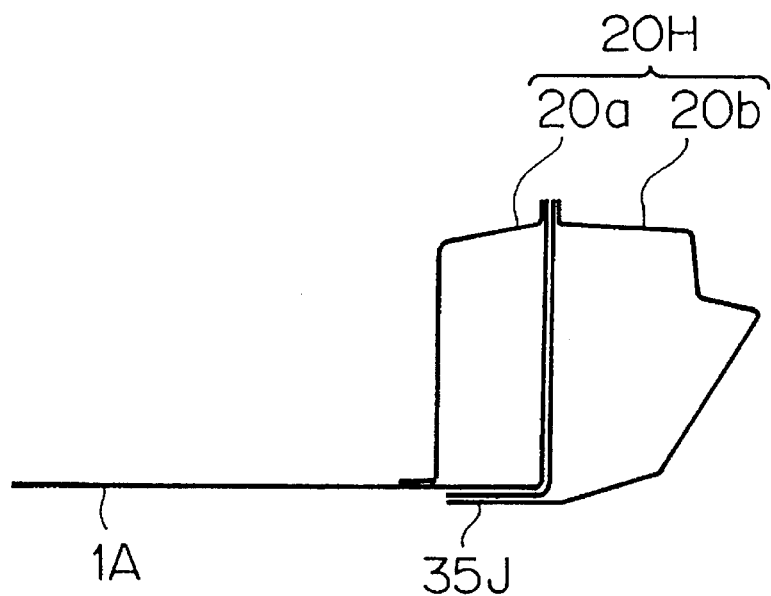
FIG. 53 is a view of joint structure similar to FIG. 3 but showing another structure.

As shown in FIG. 53, side sill 20H of steel includes cross sectioned inner side sill portion 20a formed on opposite side ends of the front floor 1A, and cross sectioned outer side sill portion 20b is integrated into the lower end of the body side panel of the upper body shell BU. A bearing portion 35J, extended horizontally, is formed on the inner and lower end portion of the outer side sill portion 20b. The under body portion BD is moved rearward to the upper body shell so that right and left end portions of the under body portion BD are engaged with the bearing portions so as to be supported.

Then, inner side sill portion 20a is fixed to the outer side sill portion 20b by means of adhesive. This structure enables the contact area thereof to be expanded so as to obtain enhanced joint strength.

Figure 54:
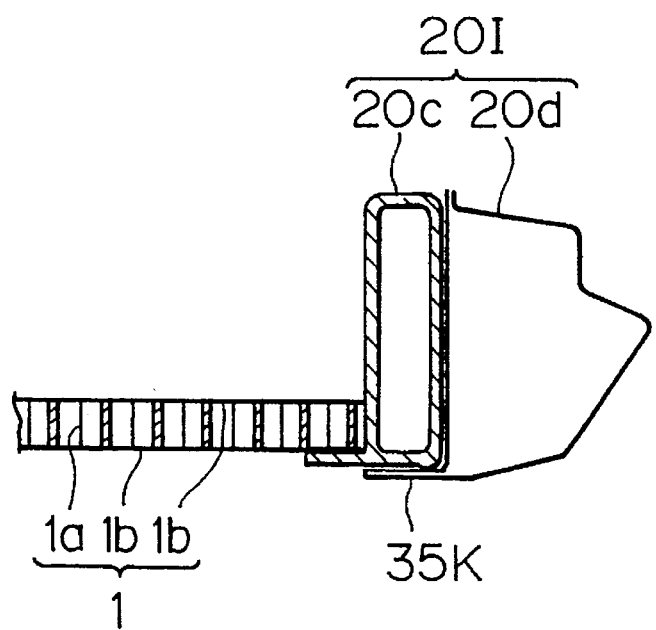
FIG. 54 is exploded perspective view of the vehicle body in accordance with another embodiment.

Alternatively, as shown in FIG. 54, side sill 20I includes cross sectioned inner side sill portion 20c of aluminum or aluminum alloy which is integrated with opposite ends of the front floor 1 having honeycomb base 1a and upper and lower reinforcing plates 1b. Cross sectioned outer side sill portion 20d is integrated with the lower end of the body side panel of the upper body shell BU. The outer side sill portion 20d is formed at an inner and lower end thereof with bearing portion 35K extending horizontally. As the under body portion BD is moved rearward relative to the upper body shell BU, right and left bearing portions 35K are engaged to support right and left of the under body portion BD so that the inner side sill portion 20c is fixed to the outer side sill portion 20 by means of adhesive. The same effect as in the former embodiment can be obtained.

Figure 55:
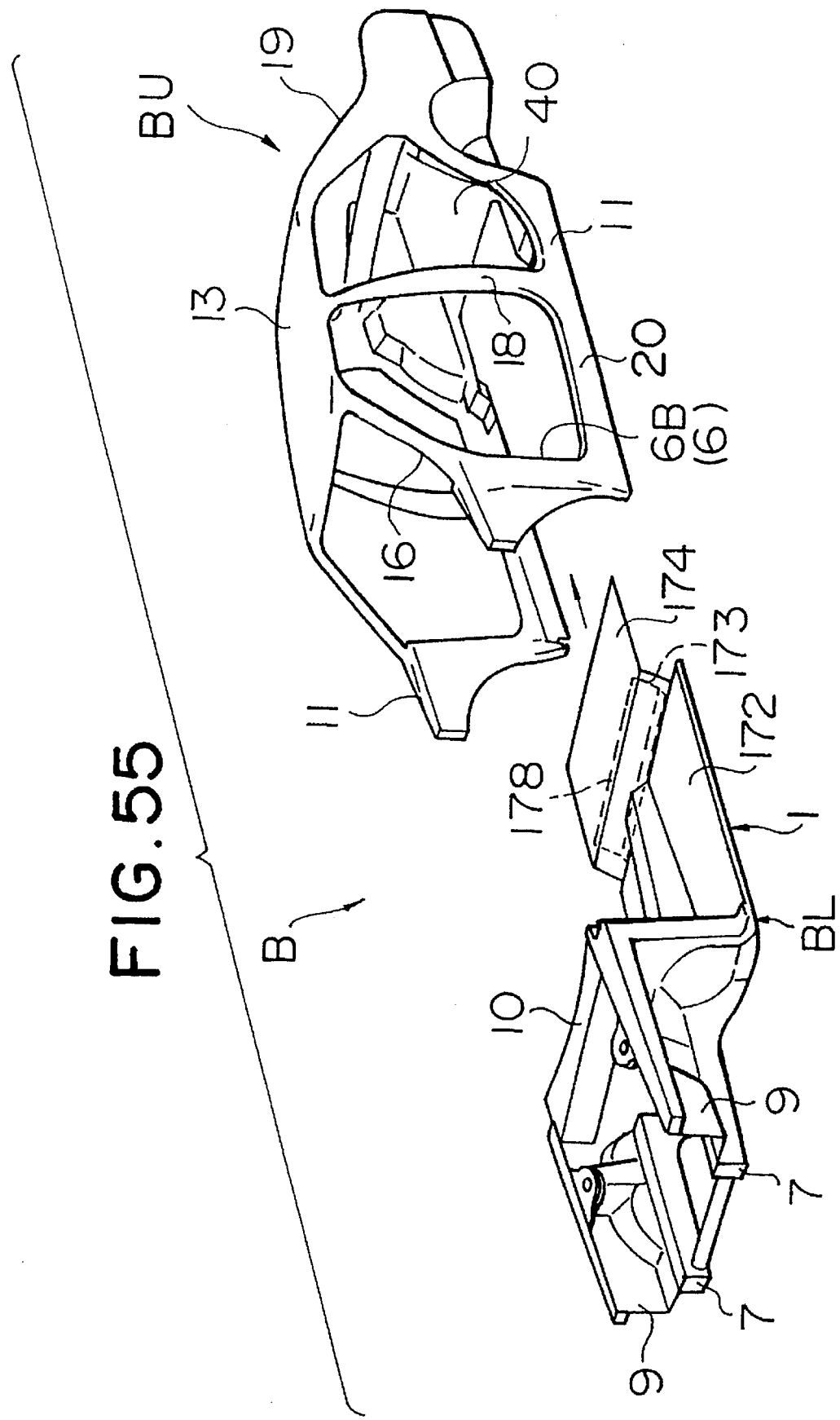
FIG. 55 is a perspective view showing a side sill.
Figure 56:
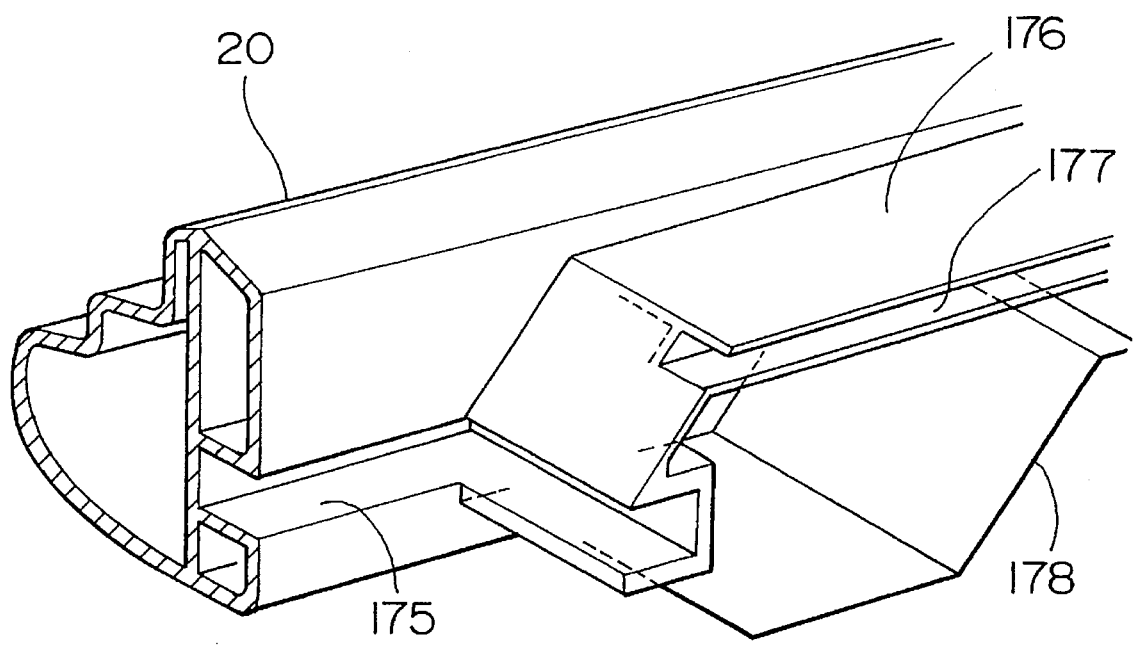
FIG. 56 is a sectional view of a joint portion between the floor and the side sill.
Figure 57:
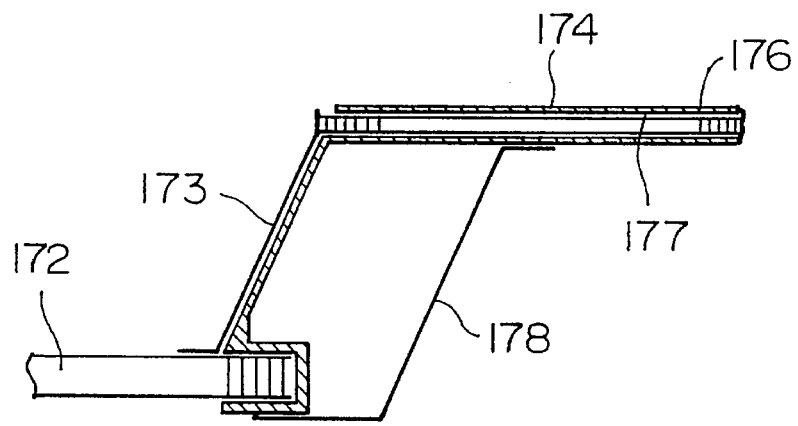
FIGS. 57 through 68 are sectional views showing other joint structures between the floor and side sill, respectively, in accordance with the present invention.
Figure 58:
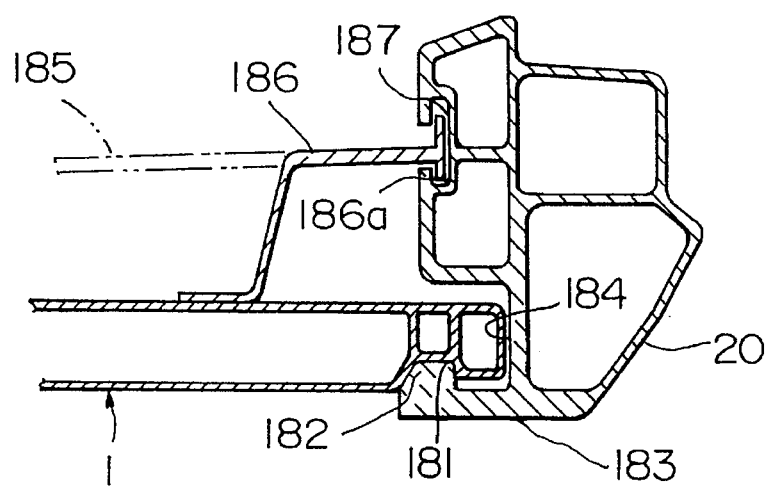

Referring to FIGS. 54–56, there is shown another embodiment of the vehicle body structure in accordance with present invention.

The floor member 1 is formed with first horizontal portion 172 on which the front seat is mounted, upright portion 173 extending upwardly from the rear end of the horizontal portion 172, and second horizontal portion 174 extending from the upper end portion of the upright portion 173 on which the rear seat is mounted. The first and second horizontal portions 173 and 174 are honeycomb structures. The upright portion 173 is made of thin plate. The upper body shell BU is provided with side sill 20 which is formed with first groove 175 for receiving opposite side end portions of the first horizontal portion 172 and horizontal portion 176 extending inward of passenger compartment. The horizontal portion 176 is formed with first groove 177 at the front end portion thereof for slidably receiving opposite ends of the second horizontal portion 174. When the lower body shell BL is moved rearward to the upper body shell BU to assemble them together, the opposite side end portions of the first horizontal portion is inserted in the groove 175 so as to be engaged and the second horizontal portion 174 is inserted into the second groove 177 so as to be engaged. The rearward movement of the floor 1 of the lower body shell BL is guided by the two grooves 175 and 177.

Referring to FIGS. 57 to 67, there are shown further joint structures of side sill 20 and floor panel 1.

The floor member 1 is formed with groove 181 extending longitudinally on the lower surface thereof. The side sill 20 is formed with extension 183 having hook 182 which is brought into slidable engagement with the groove 181 so that the rearward movement of the lower body shell BL is guided and the lower body shell BL is supported when the insertion is finished. Opposite side ends of the floor member 21 is inserted into the groove 184. Brackets 185 and 186 are provided on the upper surface of the floor member 1 for mounting the cross member and seat belt. The brackets 185 and 186 are formed with T-shaped hook portion 186a at opposite ends. The side sill 20 is formed with groove 187 with which the hook portion 186a is slidably engaged. When the lower body shell BL is moved rearward and engaged with the upper body shell BU, the hook portion 186a is brought into engagement with the groove 187.

If the front floor 1 is of honeycomb structure, it is difficult to form the groove 181 of the front floor 1. In this case, aluminum member 188b formed with the groove 181 is attached to opposite side ends of the front floor 1 of honey comb structure.

Figure 59:
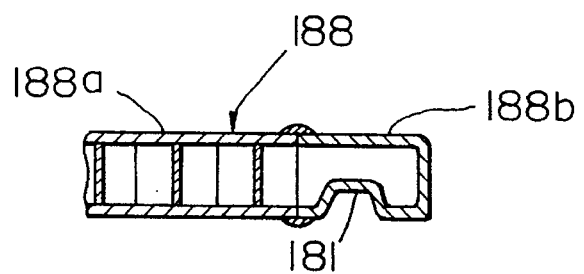

As shown in FIG. 59, the front floor 1 is formed with engaging portion 191 which is greater than the front floor 1 in thickness. The side sill 20 is formed at an inner surface with groove 192 for engaging with the engaging portion 191. Prior to joining the lower and upper body shells BL and BU, adhesive 193 is supplied to the groove 192 as shown in FIG. 59 (a). Then, engaging portion 191 of the front floor 1 is inserted rearward into the groove 192 of the side sill 20. When inserted, the adhesive 193 is intervened between the groove 192 and the engaging portion 191 to fix them.

Figure 60A:
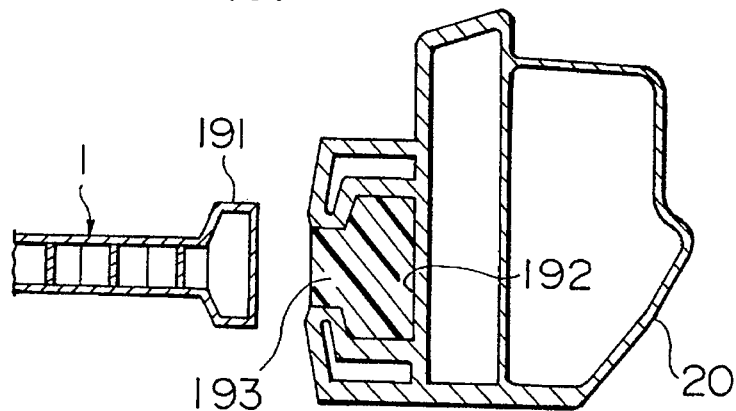
Figure 60B:
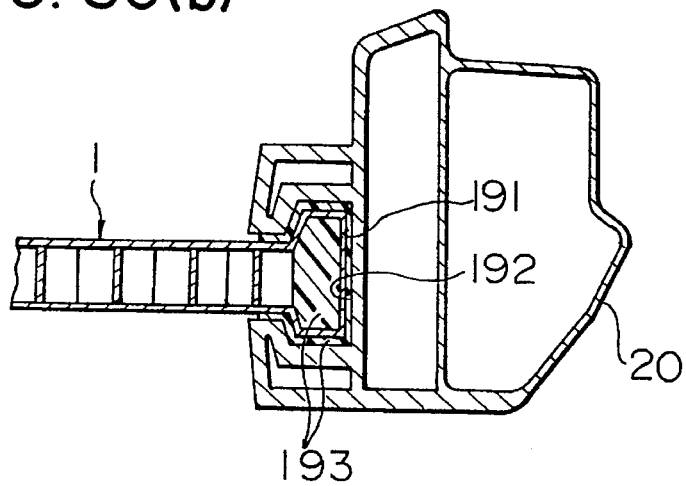

Referring to FIG. 60, there is shown another joint structure between the front floor 1 and side sill 20. The side end portion of the front floor 1 is formed with thick portion 201 extending downward, which is engaged with groove 202 of the side sill 20. Prior to insertion of the front floor 1, adhesive 204 with beads 203 is applied on bottom surface of the groove 202. As the front floor 1 is moved rearward, the thick portion 201 is brought into rolling engagement with the groove 202. Assembling force can be reduced.

Figure 61:
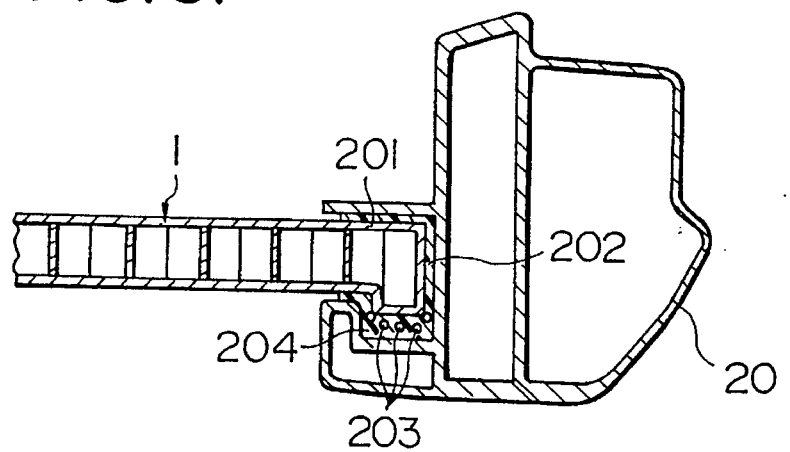

Referring to FIG. 61, side sill 20 is formed with groove 211 which slidably receives the side end 1a of the front floor 1. Prior to insertion of front floor 1, thermoplastic adhesive is applied on inner surface of the groove 211 as shown in FIG. 61 (a). Then, the front floor 1 is engaged with the front end of the side sill 20 and moved rearward in a manner such that the side end of the front floor 1 is engaged with the groove 211. After full engagement between the side end 1a and groove 211, steam 214 is introduced into inner surface 212 of channel like configuration formed surrounding the groove 211 to harden the adhesive 213 to fix the floor 1 and side sill 20.

Figure 62A:
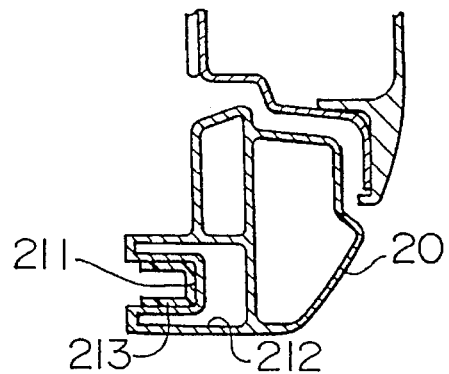
Figure 62B:
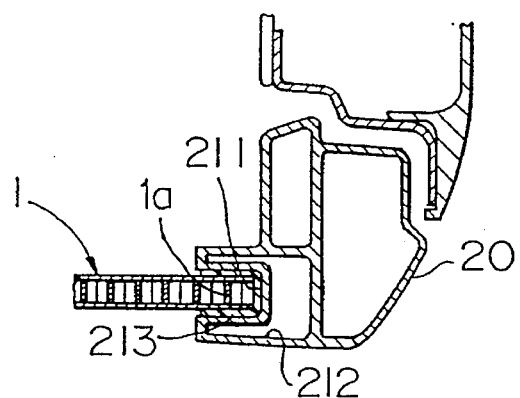
Figure 62C:
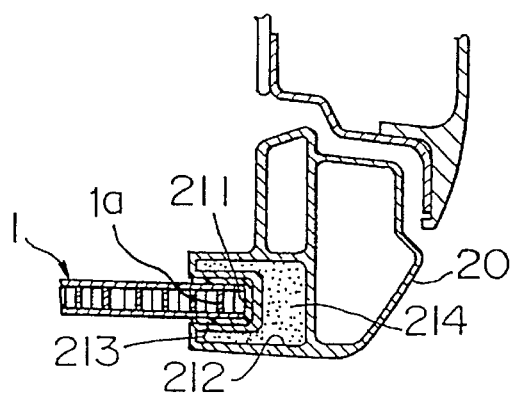

Referring to FIG. 62, after adhesive 222 is applied on groove 221 of the side sill 20, the front floor 1 is moved rearward with extension 223 being engaged with groove 221. In this case, the front floor 1 is formed with projection 224 engaged with groove 225 of support member 226 which supports the front floor 1 as it is moved rearward. According to this embodiment, positioning of the front floor 1 can be easily accomplished.

Figure 63A:
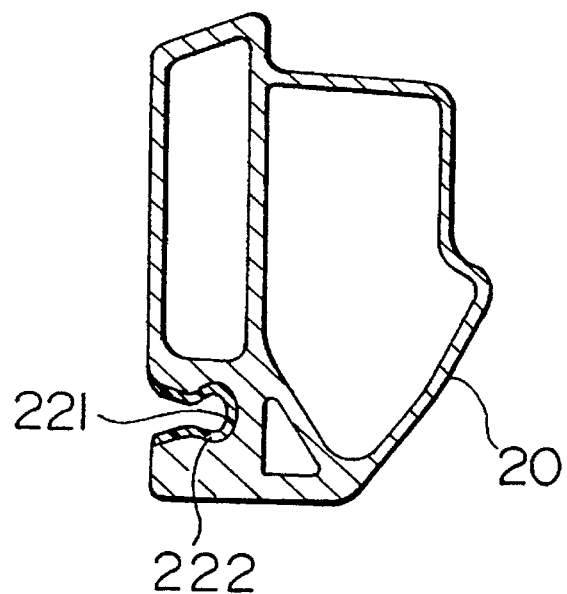
Figure 63B:
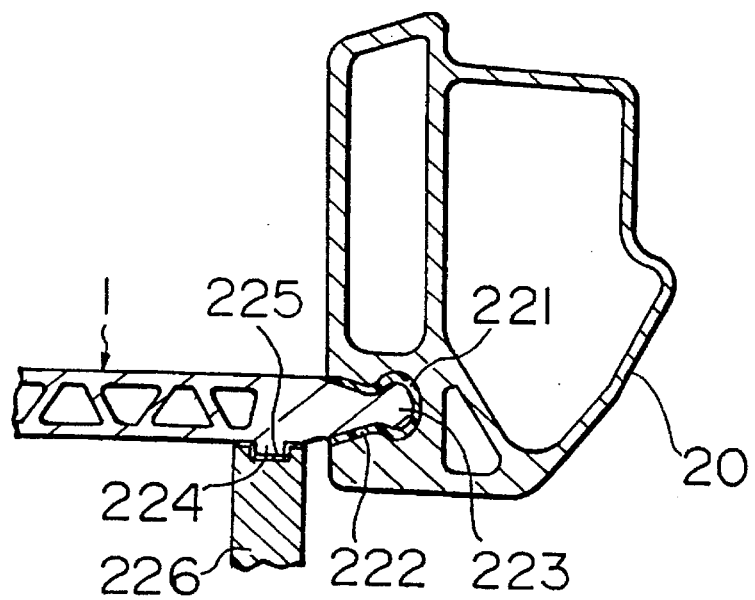
Figure 64A:
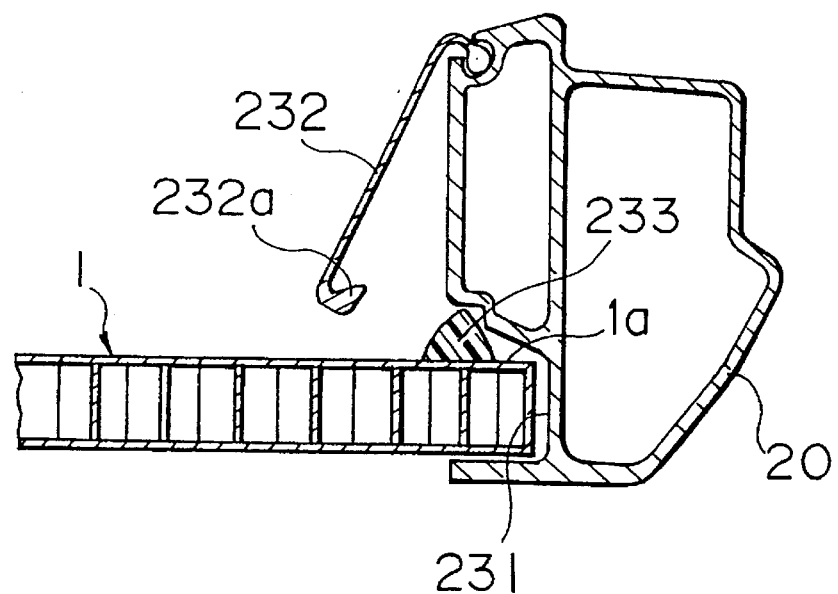
Figure 64B:
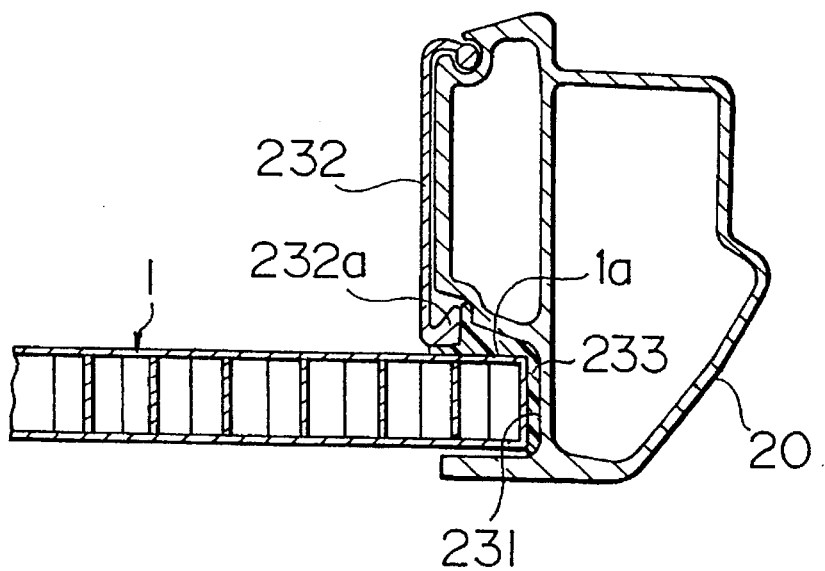

Referring to FIG. 63, the side sill 20 is provided with groove 231 for receiving side end 1a and swinging cover member 232 which can swing around the upper end thereof. Prior to the insertion of the front floor 1, adhesive 233 is applied on the side end of the front floor 1. Then, the cover member 232 is swung away from the inner surface of the side sill. The front floor 1 is moved rearward with the side end being engaged with the groove 231. Next, the cover member 232 is swung toward the inner surface of the side sill 20 to contact with it as the cover member 232 introduces the adhesive into space between the side sill 20 and side end of the front floor 1 as shown in FIG. 63 (b). As a result, hook portion 232a of the tip end of the cover member 232 is fixed to the floor 1.

Figure 65:
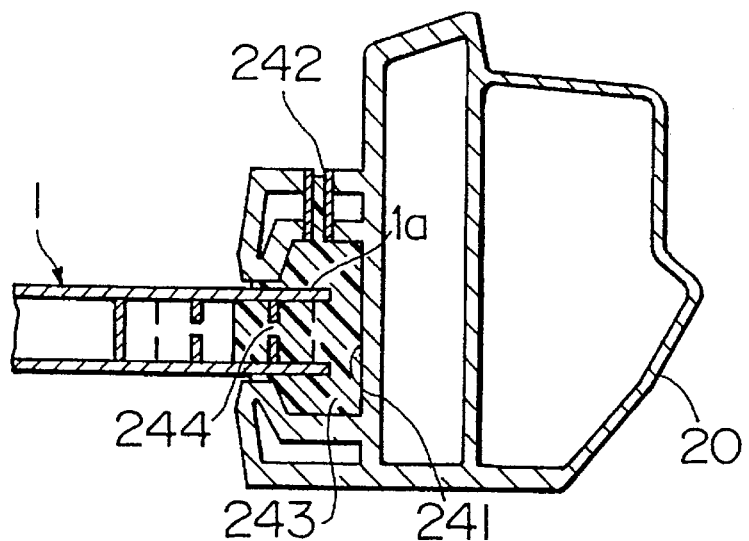

Referring to FIG. 65, the side sill 20 is formed with groove 241. In this embodiment, adhesive of urethane foam 243 is introduced into the groove 241 through the passage 242 to fix the front floor 1 with the side sill 20 after the insertion of the front floor 1. Thus, the front floor 1 is not subjected to resistance of the adhesive when inserted. This ensures the introduction of the adhesive between the front floor 1 and the side sill 20. When the front floor 1 is of honeycomb structure, it is desirable to form air bent on the floor 1.

Referring to FIG. 65, the front floor 1 is formed with a side frame portion 251 extending upwardly, which forms a groove 252 extending along the side sill 20. The side sill 20 is formed with projected structure 253 which is brought into slidable engagement with the front floor 1 through the groove 252. In this structure, the brackets 185 and 185 can be fixed to the side frame portion 251.

Figure 66:
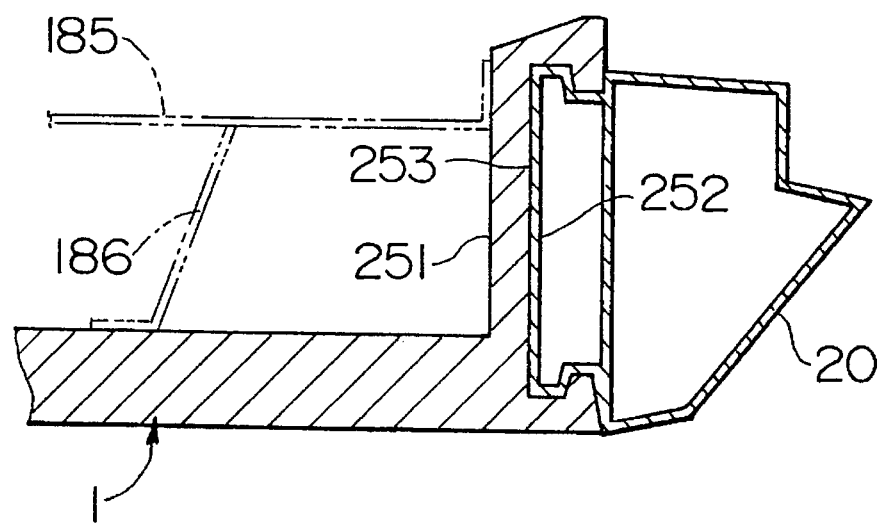

Referring to FIG. 66, the side sill 20 is formed with first groove 261, opened downwardly at a bottom outer surface, and second groove 262 opened outward at a side outer surface, both of which are extended longitudinally. The front floor 1 is formed with first extension 263, which extends upwardly, for slidably engaging with the first groove 261 and extended portion 264, which extends along the outer surface of the side sill 20. The extended portion 264 is formed with second extension 265 for slidably engaging with the second groove 262. When the front floor is inserted, adhesive 166 is applied on surfaces of grooves 261 and 262 as shown in FIG. 66(a). Then the front floor 1 is inserted and moved rearward with the grooves 261 and 262 being engaged with the extensions 263 and 264 as shown in FIG. 66(b). In this structure, the outer side of the front floor 1 forms a lower portion of the side sill to provide fresh appearance.

Figure 67A:
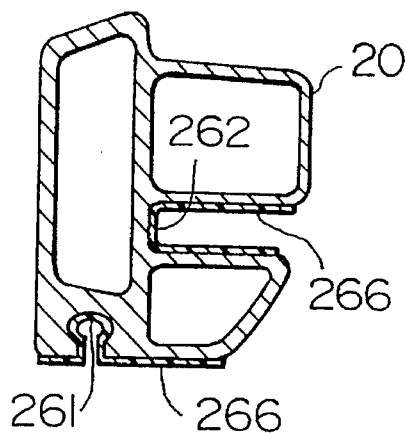
Figure 67B:
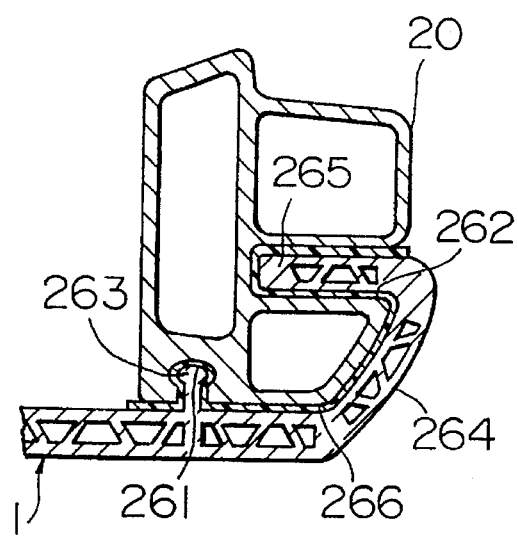
Figure 68:
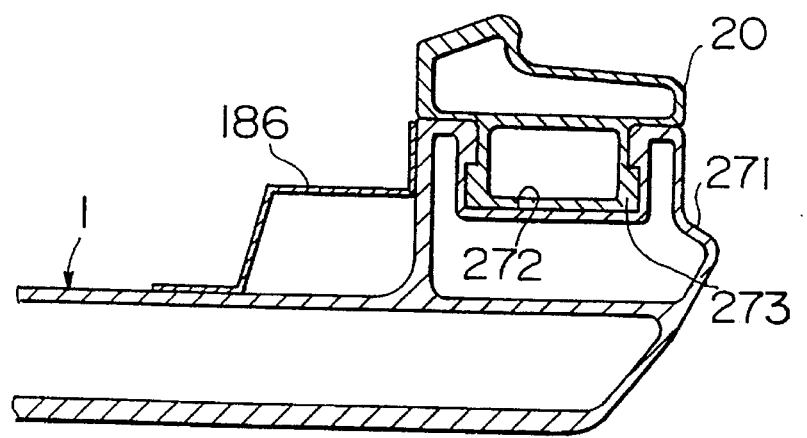

Referring to FIG. 67, the front floor 1 is formed with lower side sill portion 271, which extends upward, at the side end. The lower side sill portion 271 is formed with a groove 272, which extends longitudinally, at the top end thereof. The side sill 20 is formed with extension 273, which is brought into slidable engagement with the groove 272, at the lower end. In assembling the body shells, the front floor is moved rearward with the extension 273 being engaged with the groove 272. In this embodiment, the lower side sill portion 271 of the front floor forms a lower part of the side sill 20. In this case, the bracket 186 for mounting the seat belt can be mounted onto the lower body shell BL before the floor 1 is inserted into the side sill 20 of the upper body shell BU.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A vehicle assembling method comprising the steps of:
    assembling a lower body shell including an underbody portion, having a front floor, and a front body portion having a structure including a first front hinge pillar portion,
    assembling an upper body shell including a roof member, right and left body side panels formed with side sills having right and left bearing portions extending in a longitudinal direction of said upper body shell, and a structure including a second front hinge pillar portion,
    moving the lower body shell rearward relative to the upper body shell and in the longitudinal direction of said upper body shell, thereby engaging transverse opposite side ends of the front floor with said right and left bearing portions, and thereby combining said first and second front hinge pillar portions with each other such that an integrated front hinge pillar is formed.

2. A method as recited in claim 1 wherein the step of assembling the lower body shell includes the step of forming the lower body shell with extensions at the transverse opposite side ends and the step assembling the upper body shell includes the step of forming the upper body shell with grooves, defining said right and left bearing portions, engaged with the extensions.

3. A method as recited in claim 2 and further comprising the step of applying adhesive on a surface of the grooves prior to assembling the lower body shell with the upper body shell.

4. A method as recited in claim 1 and further comprising the steps of forming the lower body shell with grooves at the transverse opposite side ends and forming the upper body shell with extensions engagable with the grooves so that the groves and extensions facilitate relative movement of the upper body shell and lower body shell.

5. A method as recited in claim 4 and further comprising the step of applying adhesive on a surface of the grooves prior to assembling the lower body shell with the upper body shell.

6. A method as recited in claim 1 and further comprising the step of conveying the upper body shell and lower body shell to equipping lines and equipping the upper and lower body shells with parts, respectively, before moving the lower body shell rearward relative to the upper body shell.

7. A method as recited in claim 1 and further comprising the step of equipping the lower body shell including the underbody portion and the front body portion with parts before assembling the lower body shell with the upper body shell.

8. A method as recited in claim 1 and further comprising the step of equipping the underbody portion and the front body portion with parts, respectively, before assembling the upper body shell.

9. A method as recited in claim 1 and further comprising the step of separately equipping the underbody portion and the front body portion with parts before assembling the lower body shell.

10. A method as recited in claim 1 and further comprising the step of supplying one of the upper body shell, the underbody portion and the front body portion to a main equipping line.

11. A method as recited in claim 1 and further comprising the step of joining the transverse opposite side ends of the front floor with at least the right and left bearing portions of the side sills.

12. A method as recited in claim 1 and further comprising the steps of conveying the upper body shell and lower body shell to equipping lines and equipping the upper and lower body shells with parts, respectively.

13. A method as recited in claim 1 wherein said step of moving the lower body shell rearward includes moving the underbody portion rearward relative to the upper body shell to engage the transverse opposite side ends of the front floor with the right and left bearing portions.

14. A method as recited in claim 13 and further comprising the step of assembling the upper body shell and the lower body shell, including the underbody portion, and the front body portion in separate lines.

15. A method as recited in claim 13 and further comprising the steps of assembling the upper body shell, the underbody portion and the front body portion in separate lines and joining the underbody and front body portions with the upper body shell after the underbody portion is joined with the front body portion.

16. A method as recited in claim 13 and further comprising the steps of assembling the upper body shell, the underbody portion and the front body portion in separate lines and joining the front body portion with the upper body shell and the underbody portion after the underbody portion is joined with the upper body shell.

17. A method as recited in claim 13 and further comprising the steps of assembling the upper shell and the lower body shell in separate lines, applying parts to both of the upper and lower body shells, and equipping both of the upper and lower body shells with fit-in parts.

18. A method as recited in claim 13 and further comprising the steps of assembling the upper body shell, the underbody portion and the front body portion together, and then applying parts to the upper body shell, the underbody portion and the front body portion, equipping the upper body shell, the underbody portion and the front body portion with fit-in parts and fixing the upper body shell, the underbody portion and the front body portion together.

19. A method as recited in claim 1 wherein said combining step includes mating a split surface, defined on said first front hinge pillar portion, with a second split surface, defined on said second front hinge pillar portion.

20. A method as recited in claim 19 and further comprising the step of configuring said first and second split surfaces to extend transversely, forwardly and downwardly in said integrated front hinge pillar.

21. A method as recited in claim 1 and further comprising the step of configuring each of said first and second front hinge pillar portions as a closed cross-section structure.

22. A method as recited in claim 1 wherein said step of assembling said upper body shell includes locating a rear body between said right and left body side panels and further comprising the step of attaching a rear end portion of said front floor of the lower body shell to a front end portion of the rear body of the upper body shell to assemble a combination of the upper body shell and the lower shell.

23. A vehicle assembling method comprising the steps of:

providing a front floor, assembling a front body portion including a first front hinge pillar portion and defining an engine room compartment, assembling an upper body shell including a roof member, right and left body side panels formed with side sills having right and left bearing portions extending in a longitudinal direction of said upper body shell, and a second front hinge pillar portion, moving the front floor rearward relative to the upper body shell and in the longitudinal direction of said upper body shell, thereby engaging transverse opposite side ends of the front floor with said right and left bearing portions, and thereby combining said first and second front hinge pillar portions with each other such that an integrated front hinge pillar is formed.

24. A method as recited in claim 23, where said combining step includes mating a first split surface, defined on said first front hinge pillar portion, with a second split surface, defined on said second front hinge pillar portion.

25. A method as recited in claim 24 and further comprising the step of configuring said first and second split surfaces to extend transversely, forwardly and downwardly in said integrated front hinge pillar.

26. A method as recited in claim 23 and further comprising the step of configuring each of said first and second front hinge pillar portions as a closed cross-section structure.

27. A vehicle assembling method comprising the steps of:

assembling a lower body shell including an underbody portion, having a front floor, and a front body portion, assembling an upper body shell including a roof member, right and left body side panels formed with side sills having right and left bearing portions extending in a longitudinal direction of said upper body shell, and a rear body located between the right and left body side panels, moving the lower body shell rearward relative to the upper body shell, in the longitudinal direction of said upper body shell, thereby engaging transverse opposite side ends of the front floor with said right and left bearing portions, and attaching a rear end portion of said front floor to a front end portion of the rear body.

* * * * *